(12) United States Patent
Brice, Jr. et al.

(10) Patent No.: US 7,149,821 B2
(45) Date of Patent: Dec. 12, 2006

(54) PREDICTABLY DEFINING INPUT/OUTPUT CONFIGURATIONS FOR ENVIRONMENTS EMPLOYING FABRICS

(75) Inventors: Frank W. Brice, Jr., Hurley, NY (US); Scott M. Carlson, Tucson, AZ (US); John R. Flanagan, Poughkeepsie, NY (US); Charles W. Gainey, Jr., Poughkeepsie, NY (US); Eugene P. Hefferon, Poughkeepsie, NY (US); Jeffrey P. Kubala, Poughquag, NY (US); Kenneth J. Oakes, Wappingers Falls, NY (US); Roberto J. Sanchez, Poughkeepsie, NY (US); Charles E. Shapley, Salt Point, NY (US); Kenneth M. Trowell, Terrey Hills (AU); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 10/353,590

(22) Filed: Jan. 29, 2003

(65) Prior Publication Data
US 2004/0148442 A1 Jul. 29, 2004

(51) Int. Cl.
G06F 3/00 (2006.01)
G06F 15/173 (2006.01)
G06F 9/00 (2006.01)
(52) U.S. Cl. .................. 710/8; 710/9; 710/10; 710/38; 709/238; 713/1; 713/2
(58) Field of Classification Search .................. 710/9, 710/10, 11, 33, 38; 709/238; 713/1, 2
See application file for complete search history.

(56) References Cited

U.S. PATENT DOCUMENTS

| 4,564,903 | A | | 1/1986 | Guyette et al. ............. 364/300 |
|---|---|---|---|---|
| 4,843,541 | A | | 6/1989 | Bean et al. ................. 364/200 |
| 5,170,472 | A | | 12/1992 | Cwiakala et al. ........... 395/275 |
| 5,276,813 | A | | 1/1994 | Elliott et al. ................ 395/275 |
| 5,297,262 | A | * | 3/1994 | Cox et al. ..................... 710/36 |
| 5,371,897 | A | | 12/1994 | Brown et al. ............... 395/800 |
| 5,412,653 | A | | 5/1995 | Hoppe et al. .............. 370/58.2 |
| 5,414,851 | A | * | 5/1995 | Brice et al. ................. 718/104 |
| 5,526,484 | A | | 6/1996 | Casper et al. .......... 395/200.14 |
| 5,564,040 | A | | 10/1996 | Kubala .................. 395/497.04 |
| 5,568,648 | A | * | 10/1996 | Coscarella et al. ........... 710/42 |

(Continued)

FOREIGN PATENT DOCUMENTS

JP 5020080 A2 1/1993

(Continued)

OTHER PUBLICATIONS

"Method And Apparatus For A Non-Disruptive Recovery Of A Single Partition In A Multipartitioned Data Processing System", U.S. Appl. No. 10/043,489, filed Jan. 11, 2002.

(Continued)

*Primary Examiner*—Kim Huynh
*Assistant Examiner*—Alan S. Chen
(74) *Attorney, Agent, or Firm*—Eugene I. Shkurko, Esq.; Kevin P. Radigan, Esq.; Heslin Rothenburg Farley & Mesiti, P.C.

(57) ABSTRACT

In an environment employing a fabric, such as a cascading switch network, a predictable input/output (I/O) configuration is provided. The I/O configuration explicitly specifies the one or more peripheral units accessible by a program, such as an operating system. Other peripheral units not specified in the I/O configuration are not accessible, thus, providing a secure environment.

37 Claims, 9 Drawing Sheets

U.S. PATENT DOCUMENTS

| | | | |
|---|---|---|---|
| 5,920,695 A | 7/1999 | Hathorn et al. | 395/200.38 |
| 5,996,026 A * | 11/1999 | Onodera et al. | 710/3 |
| 6,065,067 A * | 5/2000 | Hobson et al. | 710/8 |
| 6,125,411 A * | 9/2000 | Sato | 710/38 |
| 6,148,004 A | 11/2000 | Nelson et al. | 370/463 |
| 6,275,498 B1 | 8/2001 | Bisceglia et al. | 370/438 |
| 6,338,083 B1 | 1/2002 | Casper et al. | 709/213 |
| 6,513,114 B1 * | 1/2003 | Wu et al. | 713/2 |
| 2002/0184392 A1 * | 12/2002 | Parthasarathy et al. | 709/249 |
| 2003/0033427 A1 * | 2/2003 | Brahmaroutu | 709/238 |
| 2003/0076788 A1 * | 4/2003 | Grabauskas et al. | 370/254 |

FOREIGN PATENT DOCUMENTS

JP     8018555 A2     1/1996

OTHER PUBLICATIONS

"Method And Apparatus For Obtaining Multiple Port Addresses By A Fibre Channel From A Network Fabric", U.S. Appl. No. 10/006,948, filed Dec. 3, 2001.

* cited by examiner

PREDICTABLY DEFINING INPUT/OUTPUT CONFIGURATIONS FOR ENVIRONMENTS EMPLOYING FABRICS

TECHNICAL FIELD

This invention relates, in general, to input/output (I/O) processing, and in particular, to predictably defining I/O configurations for computing environments employing fabrics.

BACKGROUND OF THE INVENTION

A fabric is, for instance, a switching network employed to interconnect servers and peripheral units. Fabric switch networks, such as those available with the Fiber Channel Storage Area Network technology, offered by International Business Machines Corporation, Armonk, N.Y., relieves the topology constraints imposed by a single switch environment. These networks enable the interconnection of geographically distant sites with a minimum number of fibre links. This is particularly beneficial to those customers that maintain data centers in two or more sites for disaster recovery.

Each end point (i.e., server or peripheral unit port) on the fabric is referred to as an N_Port and has, for instance, a 3-byte identifier. Each frame sent through the fabric carries the N_Port ID of the destination of that frame, and the fabric uses this ID to route the frame through the fabric.

In an open systems world, each server's operating system determines the N_Port IDs for the set of target peripheral units it can access through a discovery process, which includes sending queries to the name server facility within the fabric. It is then up to the operating system to determine which of the accessible targets it will actually use. This discovery approach is inherently insecure. That is, each operating system has visibility, and therefore, access to all of the peripheral units on the Storage Area Network, independent of whether it is allowed to use those units. Therefore, one operating system could corrupt, either by accident or intentionally, the data of another operating system. Further, this discovery approach does not provide a stable and predictable configuration. That is, the peripheral units that can be accessed by a server are not precisely defined.

Thus, a need exists for a capability that provides a secure environment. As one example, a need exists for a capability that predictably defines I/O configurations for environments that employ fabrics.

SUMMARY OF THE INVENTION

The shortcomings of the prior art are overcome and additional advantages are provided through the provision of a method of providing input/output (I/O) configurations of a computing environment. The method includes, for instance, explicitly specifying which one or more peripheral units of a computing environment are accessible by a program of the computing environment to provide a predictable I/O configuration, wherein the one or more peripheral units are accessible via a fabric.

In one embodiment, the fabric includes a plurality of switches, and wherein the fabric has autonomy over a choice of one or more links coupling one or more switches of the plurality of switches to define a path to a peripheral unit of the one or more peripheral units.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided that enables the defining of a predictable I/O configuration for an environment that employs a fabric, such as a switch network, to couple a program (e.g., an operating system) and one or more peripheral units. The I/O configuration explicitly specifies which peripheral units are accessible by the program, such that the program cannot access other peripheral units not defined in the I/O configuration. This provides a secure environment.

Figure 1A:
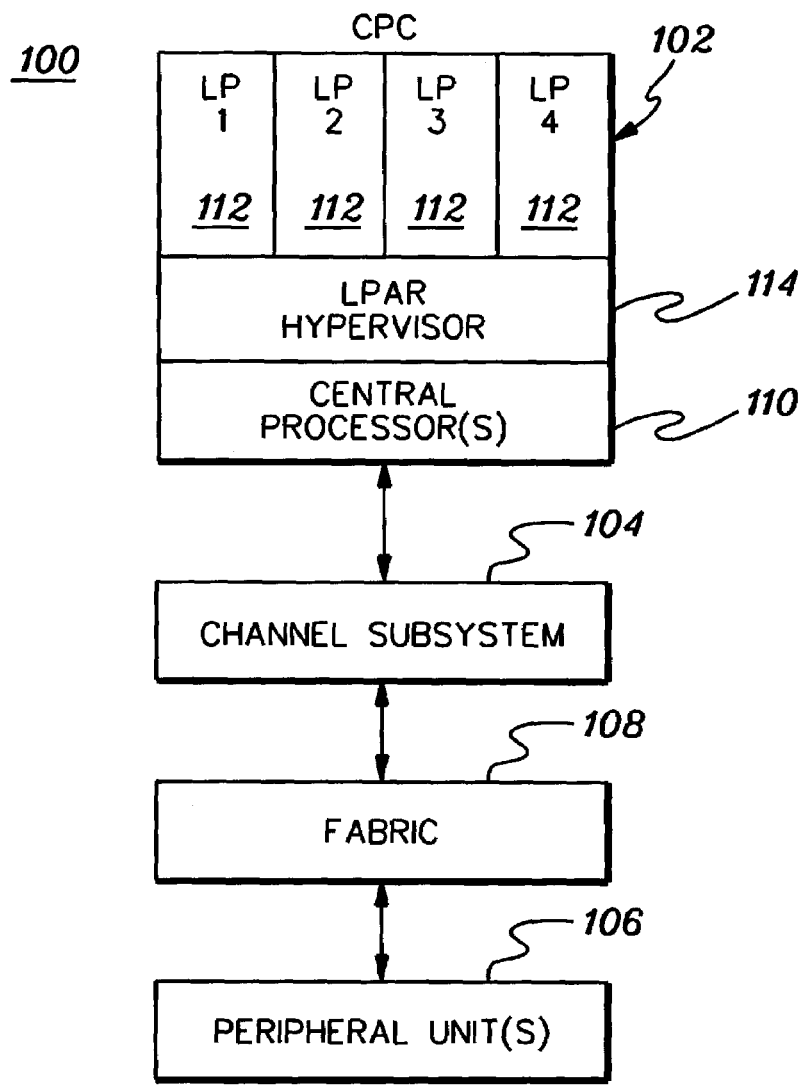
FIG. 1a depicts one embodiment of a computing environment to incorporate and use one or more aspects of the present invention.

One embodiment of a computing environment to incorporate and use one or more aspects of the present invention is described with reference to FIG. 1a. In one example, computing environment 100 is a Storage Area Network (SAN) based on the z/Architecture, offered by International Business Machines Corporation, Armonk, N.Y. The z/Architecture is described in an IBM Publication, entitled "IBM z/Architecture Principles of Operation," Publication No. SA22-7832, which is hereby incorporated herein by reference in its entirety.

As one example, computing environment 100 includes a central processor complex (CPC) 102 coupled to a channel subsystem 104, which is further coupled to one or more peripheral units 106 via a fabric 108. Central processor complex 102 includes, for instance, one or more central processors 110, one or more partitions 112 (e.g., logical partitions (LP)), and at least one logical partition hypervisor 114, each of which is described below.

Central processors 110 are physical processor resources allocated to the logical partition. In particular, each logical partition 112 has one or more logical processors (not separately shown for clarity), each of which represents all or a share of a physical processor 110 allocated to the partition. The logical processors of a particular partition 112 may be either dedicated to the partition, so that the underlying processor resource 110 is reserved for that partition, or shared with another partition, so that the underlying processor resource is potentially available to another partition.

A logical partition functions as a separate system and has one or more applications and a resident operating system therein, which may differ for each logical partition. In one embodiment, the operating system is the z/OS operating system, the z/VM operating system or the TPF operating system, offered by International Business Machines Corporation, Armonk, N.Y.

Logical partitions 112 are managed by a logical partition hypervisor 114, which is implemented by licensed internal code running on processors 110. The logical partitions and logical partition hypervisor each comprise one or more programs residing in respective partitions of central storage associated with the central processors. One example of logical partition hypervisor 114 is PR/SM, offered by International Business Machines Corporation, Armonk, N.Y. Further details regarding logical partitions are described in, for instance, Guyette et al., U.S. Pat. No. 4,564,903, entitled "Partitioned Multiprocessor Programming System", issued on Jan. 14, 1986; Bean et al., U.S. Pat. No. 4,843,541, entitled "Logical Resource Partitioning Of A Data Processing System", issued on Jun. 27, 1989; and Kubala, U.S. Pat. No. 5,564,040, entitled "Method And Apparatus For Providing A Server Function In A Logically Partitioned Hardware Machine", issued on Oct. 08, 1996, each of which is hereby incorporated herein by reference in its entirety.

Coupled to one or more of the central processing complexes is channel subsystem 104. Channel subsystem 104 directs the flow of information between peripheral units 106 and main storage. It relieves the central processors of the task of communicating directly with the peripheral units and permits data processing to proceed concurrently with input/output processing. Further details regarding channel subsystems are described in Casper et al., U.S. Pat. No. 5,526,484, entitled, "Method And System For Pipelining The Processing Of Channel Command Words", issued on Jun. 11, 1996, which is hereby incorporated herein by reference in its entirety.

Figure 1B:
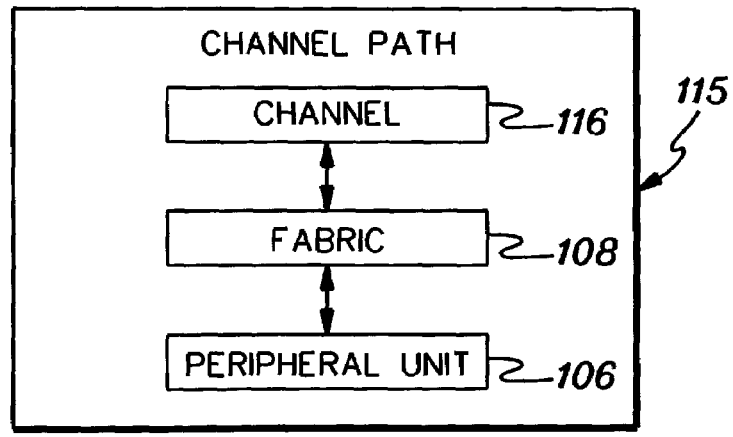
FIG. 1b depicts one example of a channel path used in accordance with an aspect of the present invention.

The channel subsystem uses one or more channel paths as communication links in managing the flow of information to or from peripheral units 106. Each channel path 115 (FIG. 1b) includes a channel 116 of channel subsystem 104 coupled to a peripheral unit 106 via at least a portion of fabric 108. The channel is, for instance, a fibre channel, and the fabric is a switching network of a plurality of switches and links (referred to herein as a cascade). The fabric has autonomy over the choice of one or more links that comprise a channel path. That is, one or more links to be used are selected by the fabric itself. Further details regarding fibre channels and/or cascading are described in Casper et al., U.S. Pat. No. 6,338,083, entitled "Method And Apparatus For Transfer Of Information Using Optical Fibre Connections", issued on Jan. 8, 2002; and Hoppe et al., U.S. Pat. No. 5,412,653, entitled "Dynamic Switch Cascading System", issued on May 2, 1995, each of which is hereby incorporated herein by reference in its entirety.

A peripheral unit may be accessible by the channel subsystem by more than one channel path. As one example, a peripheral unit is a control unit, which may be coupled to one or more I/O devices. The control unit accepts control signals from the channel subsystem, controls the timing of data transfer over the channel path, and provides indications concerning the status of the device. The control unit may be housed separately or it may be physically and logically integrated with the I/O device, the channel subsystem, or a central processor.

In addition to one or more channels, a channel subsystem includes one or more subchannels. Each subchannel is provided for and dedicated to an I/O device coupled to the program through the channel subsystem. Each subchannel provides information concerning the associated I/O device and its attachment to the channel subsystem. The subchannel also provides information concerning I/O operations and functions involving the associated I/O device. The subchannel provides a logical appearance of a device to the program and is the means by which the channel subsystem provides information about associated I/O devices to the central processors, which obtain this information by executing I/O instructions. The subchannel has internal storage that includes information in the form of a channel command word (CCW) address, a channel path identifier, device number, count, status indication and I/O interruption subclass code, as well as information on path availability and functions pending or being performed. I/O operations are initiated with a device by the execution of I/O instructions that designate the subchannel associated with the device.

In accordance with an aspect of the present invention, in order for a program of the computing environment, such as an operating system, to know which peripheral units it can access, an I/O configuration definition is provided. This I/O configuration definition provides a predictable configuration in that the configuration is explicitly specified and not merely haphazardly discovered by a discovery process, such as the known "walk the bus" technique. This provides a secure environment in that the program can only access the peripherals defined thereto and cannot access others.

As one example, the I/O configuration is defined by a configuration program, which is used to translate human generated syntax into binary data that can be used by the machine, when it is powered on. One example of such a configuration program is the I/O Configuration Program (IOCP), offered by International Business Machines Corporation, Armonk, N.Y. Various details regarding IOCP are described in "zSeries Input/Output Configuration Program User's Guide for IYP IOCP", IBM Publication No. SB10-7029-03, Fourth Edition, December 2002, which is hereby incorporated herein by reference in its entirety.

Figure 2:
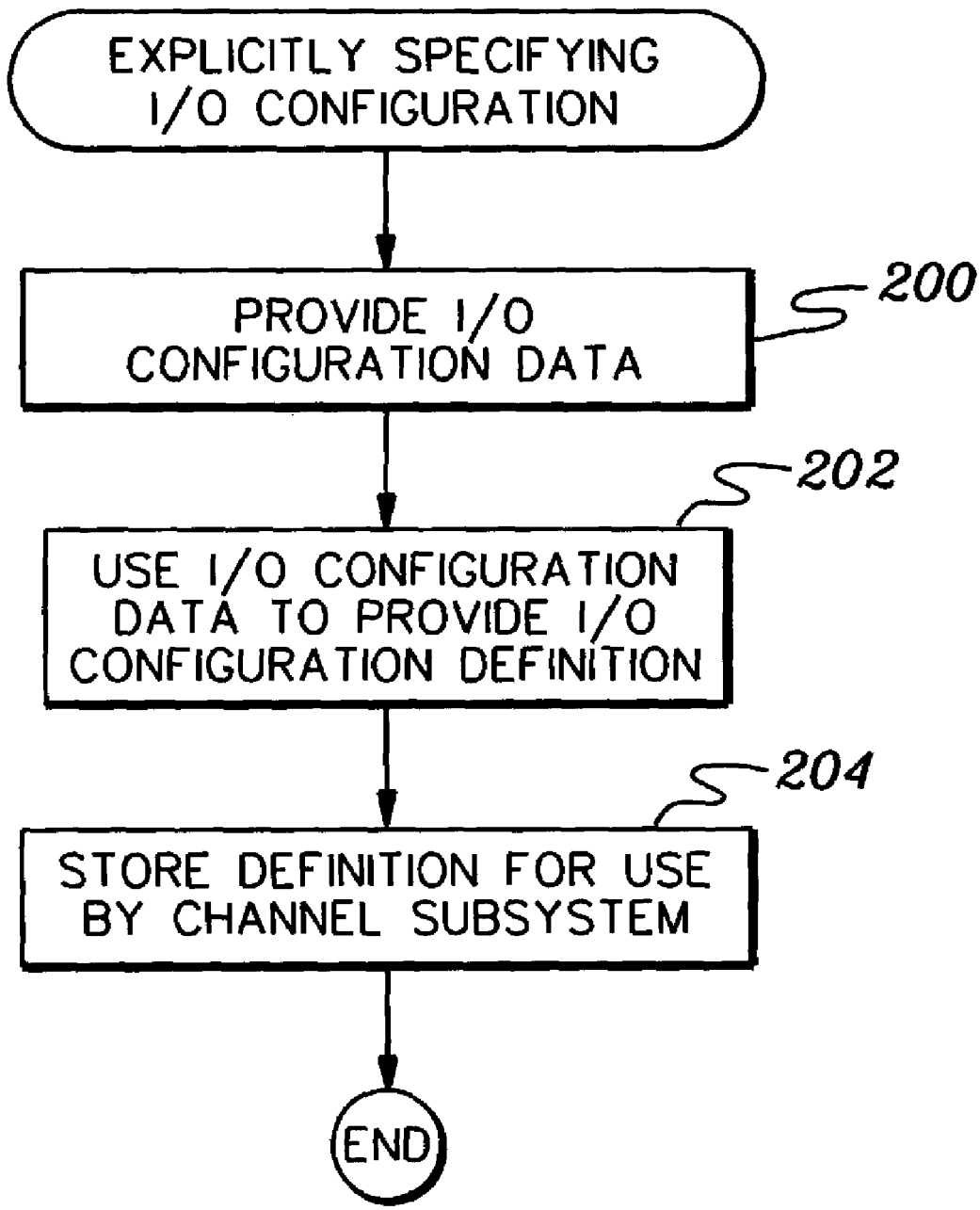
FIG. 2 depicts one embodiment of the logic associated with explicitly specifying an I/O configuration, in accordance with an aspect of the present invention.

One embodiment of the logic associated with defining an I/O configuration using a configuration program, such as IOCP, is described with reference to FIG. 2. Initially, I/O configuration data is provided to the configuration program, STEP 200. In one example, this I/O configuration data is provided by one or more input statements, including, for instance, the following:

1. An Id statement, which is an optional statement that defines a heading data for I/O configuration reports;
2. A resource statement that specifies the logical partitions in an LPAR mode configuration;
3. One or more CHPID statements used to specify one or more channel paths;
4. One or more control unit statements (CNTLUNIT) used to specify one or more control units attached to the channel paths;
5. One or more I/O device statements (IODEVICE) used to specify one or more I/O devices assigned to the control units. In one example, up to 256 I/O devices can be defined in an I/O device statement.

As described in further detail below, the CHPID and CNTLUNIT statements as used to specify which peripheral units (e.g., control units) are accessible by a specified program (e.g., operating system). In particular, the CHPID statement associates an operating system with one or more channel paths, and the CNTLUNIT statement associates one or more channel paths with a control unit.

One example of a channel path (CHPID) statement is as follows:

```
CHPID    PATH=(chpid number[,chpid number]...)
         TYPE={FC}
         [SWITCH=number]
         [PART={(name|0[,REC])|
                (access list)|
                ((access list)[,(candidate list)][,REC])}]
         [PARTITION={(name|0 [,REC])|
                (access|
                ((access list)[,(candidate list)][,REC])}]
         [NOTPART={(access list)|
                ((access list)[,(candidate list)])}]
         [SHARED]
         [OS=value]
         [IOCLUSTER=name]
``` where:
PATH=chpid number specifies, for instance, a two-digit hexadecimal number for each chpid number. A maximum of eight CHPIDs can be specified, in this example.
TYPE=specifies the mode of I/O operation for the channel path. If more than one channel path is specified in a statement, all channel paths are to have the same TYPE value. An example of a TYPE value includes, for instance:
FC, which specifies that the channel path is a FICON channel and that the control units and I/O devices that attach to this channel path support the FICON Architecture protocol. FC channel paths can communicate with each other in channel-to-channel communications.
SWITCH=number specifies an arbitrary number for a FICON Director to which the channel paths on the CHPID statement are assigned. The number can range, for instance, from 00–FF for a maximum of 256 for each IOCDS (described below). A channel path may be assigned to only one number.
For a FICON channel path, the specified switch number is of the entry switch, which is the switch to which the FICON channel connects.
PART=
PARTITION=specifies the information used to generate an LPAR IOCDS. It is ignored in basic (non-LPAR) mode. The logical partitions specified with this keyword are the logical partitions that are allowed to access the channel path (CHPID). Using this keyword is how access to the fabric is restricted to specific programs (i.e., those programs running in the specified logical partitions).
NOTPART=specifies the information used to generate an LPAR IOCDS. This is just an alternative way of specifying PART=. Instead of an inclusionary list of logical partitions, NOTPART can be used to exclude certain logical partitions and, by default, include all the rest.
SHARED specifies that the channel paths on the CHPID are shared.
OS=value specifies information relevant to an operating system that is to be associated with a channel path.
IOCLUSTER=name specifies an I/O cluster name. This keyword is ignored in basic mode.

In one example, a control unit statement includes the following:

```
CNTLUNIT    CUNUMBR=number
            PATH=(chpid[,chpid]...)
            [LINK=(link address[,link address]...)]
            [CUADD=address]
            UNIT=type
            UNITADD=((address[,number]),...)
``` where:
CUNUMBR=number specifies, for instance, the hexadecimal number that is assigned to the control unit. One to four hexadecimal digits in the range of 0000–FFFE can be specified, as examples. A unique number is assigned to each control unit. The numbers can be assigned arbitrarily.
PATH=chpid specifies the channel paths attached to the control unit. In one example, two hexadecimal digits are specified for each channel path identifier (chpid). In one embodiment, a maximum of eight chpids can be specified.
LINK=link address specifies the link addresses to which the control unit is attached. The order in which the link addresses are specified corresponds to the order in which the channel paths are specified in the PATH keyword. For example, the second link address identified in the LINK keyword corresponds to the second channel path identified in the PATH keyword. This keyword is optional if none of the channel paths in the PATH keyword attaches to the FICON director (SWITCH keyword). Link addresses are specified, for instance, with two (e.g., representing AA) or four (e.g., representing DD AA) hexadecimal digits. The valid link address range is 0000–FFFF for an FC channel path.

CUADD=address specifies the logical address for the control unit.

UNIT=type specifies the type of control unit (e.g., Ficon channel-to-channel).

UNITADD=
  address specifies the unit address of the I/O devices that are recognized by the control unit. As one example, two hexadecimal digits are specified in the range of 00–FF. For instance, UNITADD=((0A), (0B), (0F)) specifies that unit addresses 0A, 0B, and 0F are recognized by the control unit. At least one unit address is to be specified. A unit address need not represent an attached device.
  number specifies the number of sequential unit addresses recognized by the control unit. A one-, two-, or three-digit decimal value in the range of 1–256, for example, is specified. For instance, UNITADD=((0A, 3)) specifies that unit addresses 0A, 0B, and 0C are recognized by the control unit. The unit address plus the number of addresses is not to exceed a hexadecimal address of FF. If the number is omitted, a value of 1 is assumed.

The IOCP takes these human generated input statements (e.g., CHPID, Control Unit and I/O Device) that represent the actual channels, control units and devices that make up a given I/O configuration and generates a file, referred to as an I/O Configuration Data Set (IOCDS), STEP 202. The IOCDS is made up of different kinds of data structures for a machine to read when it initializes. For example, the IOCDS includes a CHPID data structure for the channel subsystem. This data structure has an array of 256 entries, each entry indexed by a CHPID number. It also includes logical information that can vary based on the channel subsystem. For instance, it includes an indication that this CHPID is defined, and a list of logical partitions that may access this CHPID. Additionally, there is a control unit data structure which includes information regarding the control unit, such as the CHPID number and specifying link addresses. Another resource that is represented in the IOCDS is the I/O device. Each device is represented by a data structure called a subchannel. This data structure includes the channel paths that can access the I/O device.

The I/O configuration definition process is performed for each I/O resource (e.g., channels, control units and/or devices) within a channel subsystem and that collection of input definitions is called Channel Subsystem X.

The IOCDS may be written to a storage medium, such as a support element hard disk, STEP 204. This allows the I/O configuration data to be loaded into the hardware system area (HSA), at power on reset. The channel subsystem subsequently uses the data to control I/O requests.

For example, the channel subsystem receives from the program the name of a peripheral unit to be accessed, and determines, based on the information provided by IOCP, the destination address corresponding to that peripheral unit. The destination address includes, for instance, three fields: DD, which identifies the switch in the fabric; AA, which identifies the port on the selected switch; and PP, which is used when arbitrated loop is provided and is a constant, when it is not provided. DD and AA are provided by IOCP and the channel subsystem appends PP, which is provided by the channel subsystem itself. This destination address is then used to access the peripheral unit.

In another example, IOCP could provide all three bytes of the address.

In addition to explicitly specifying an I/O configuration using a configuration program, the configuration can be defined or modified using Channel Subsystem Call (CHSC) commands, which include a subset of commands also known as dynamic I/O (DIO) commands. These commands have the ability to change the active I/O configuration definition without requiring a restart of the channel subsystem (e.g., re-IML or a re-IPL) to make the change become effective.

Examples of dynamic I/O commands include a Change Channel Path Configuration command and Change Control Unit Configuration command, embodiments of which are described in Cwiakala et al., U.S. Pat. No. 5,170,472, entitled "Dynamically Changing A System I/O Configuration Definition", issued Dec. 8, 1992, which is hereby incorporated herein by reference in its entirety. Since the Change Control Unit Configuration command has been modified for one or more aspects of the present invention, it is also described in further detail below.

The Change Control Unit Configuration command has been updated, for example, to be able to specify 1-, 2- or 3-byte link addresses, when the first control unit is added to a channel path. Additionally, the command establishes the link address size (1, 2 or 3) that is to be specified on subsequent control unit additions.

The Change Control Unit Configuration command is used to add, modify, or delete the description of a control unit in the I/O-configuration definition. The Change Control Unit Configuration command can be executed asynchronously and is not interpretively executed, in one example. Specification of the operation to be performed and the information required to change the I/O-configuration definition are provided in a command request block.

Figure 3A:
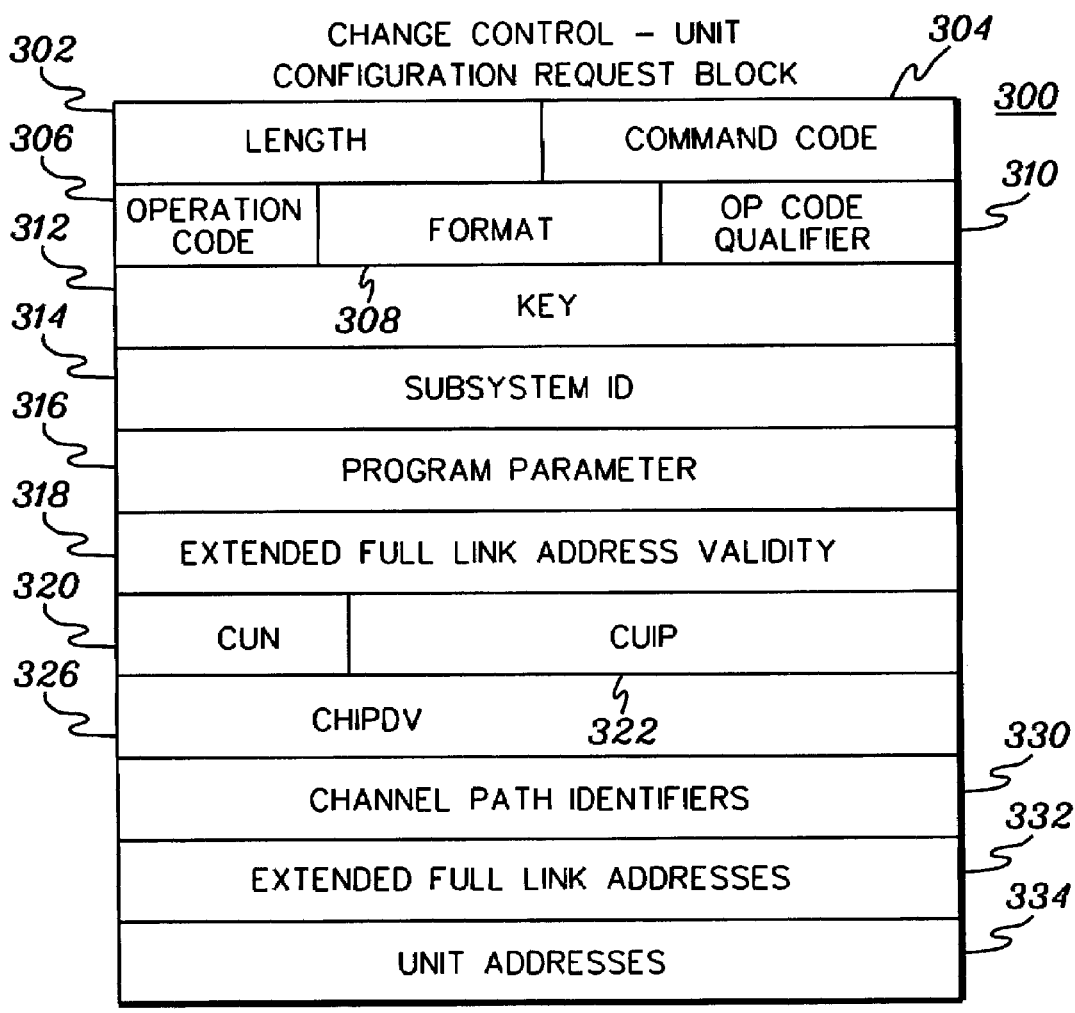
FIG. 3a depicts one embodiment of a request block for a change control unit configuration command, in accordance with an aspect of the present invention.

One embodiment of a request block for a Change Control Unit Configuration command is described with reference to FIG. 3a. In one example, a request block 300 includes, for instance:

(a) Length Field 302: This field specifies the length of the request block.

(b) Command Code 304: This field specifies the Change Control Unit Configuration command.

(c) Operation Code (OC) 306: This field includes a value that specifies the type of control-unit configuration operation that is to be performed. The fields of the request-data area of the command request block that are used are dependent upon the operation to be performed. The meaning of each value is, for example, as follows:

0 Add the description of the specified control unit to the I/O-configuration definition.
  1 Modify the description of the specified control unit in the I/O-configuration definition. The type of modification is specified by the operation-code qualifier (OCQ). The CUN field is used to identify the control unit for which the description is to be modified. Additional fields may be used, depending on the contents of the OCQ field. Additional fields that are used are identified in the descriptions of the OCQ values.

2 Delete the description of the specified control unit from the I/O-configuration definition. The CUN field is examined for use in performing the delete operation.

3 Store additional information: One or more subchannel blocks that could not be contained in the command response block for a previous change control unit configuration command are requested.

(d) Format (FMT) 308: The command-request-format field includes an unsigned integer whose value specifies the layout of the command-request block. The request block described herein is format one, as one example.

(e) Operation-Code Qualifier (OCQ) 310: This field includes a value that qualifies the operation specified by the OC field. The meaning of each value of the OCQ field is, for instance, as follows:

0 The operation specified by the OC field is not qualified by the OCQ field.

1 Add channel-path access: The I/O-configuration definition is modified by adding one or more channel paths to the current list of channel paths that can be used to access the specified control unit.

Subchannels that are added as a result of the modify (add channel-path access) operation are in the initialized state and are not enabled.

When one or more channel paths that are in the configured state are placed on the list of channel paths that can be used to access the specified control unit, the corresponding bits of the path-installed mask (PIM) and the path-available mask (PAM) for subchannels associated with I/O-devices that are described as being attached to the specified control unit are set to ones. If the channel paths are in the not-configured state, the appropriate PIM bits are set to ones.

This OCQ value may be specified, when the OC field specifies the modify operation.

The CHPIDV and CHPID fields are used for this modify operation. The EFLA fields are used when the corresponding channel paths are channel-path types that adhere to the serial-I/O architectures, and the link-address portions of the EFLA fields may be used (depending on the model), when the corresponding channel paths are fiber-extended channel paths, or fibre-channel channel paths.

Each valid CHPID field specifies a channel path that is to be added to the list of channel paths for the specified control unit. When EFLA fields are used, the EFLA field that is associated with each valid CHPID field is also valid and is used to establish the identity of the specified control unit on the channel path specified by the CHPID field.

2 Delete channel-path access: The I/O-configuration definition is modified by deleting one or more channel paths from the current list of channel paths that can be used to access the specified control unit.

Subchannels that are deleted as a result of the modify (delete channel-path access) operation have the device-number-valid bit set to zero.

When one or more channel paths are deleted from the list of channel paths that can be used to access the specified control unit, the corresponding bits of the path-installed mask (PIM) and the path-available mask (PAM) for subchannels associated with I/O-devices that are described as being attached to the specified control unit are set to zeros.

This OCQ value may be specified, when the OC field specifies the modify operation.

The CHPIDV and CHPID fields are used for this modify operation. The CHPIDV field is to contain at least one bit that is one. Each valid CHPID field specifies a channel path that is to be deleted from the list of channel paths for the specified control unit.

3 Add unit address: The I/O-configuration definition is modified by adding one or more unit addresses to the current list of unit addresses that are recognized by the specified control unit. Each added unit address becomes available to any logical partition that has channel-path accessibility to the control unit.

This OCQ value may be specified, when the OC field specifies the modify operation.

The unit-address field is used for this modify operation.

4 Delete unit address: The I/O configuration definition is modified by deleting one or more unit addresses from the current list of unit addresses that are recognized by the specified control unit. Each deleted unit address becomes unavailable to any logical partition that has channel-path accessibility to the control unit.

This OCQ value may be specified, when the OC field specifies the modify operation.

The unit-address field is used for this modify operation.

(f) Key 312: This field includes a storage access key used by the channel subsystem to access the command request block and the command response block for asynchronous operations that are initiated by the command.

(g) Subsystem ID (SID) 314: The SID field specifies the CHSC subchannel that is used to perform operations that are asynchronous to CHSC execution.

(h) Program Parameter 316: This field includes a value that the program associates with this change control unit configuration command.

(i) Extended Full Link Address Validity (EFV0–7, for example) 318: This field includes, for instance, eight 4-bit validity fields. EFV0 is associated with CHPID0, EFLA0, and so forth. When CHPIDV.n is one, then EFVn is valid; when zero, not valid. A 4-bit EFVn field has, for instance, the following definition:

Bits Meaning

0000 A 1-byte EFLA is in the associated EFLA field, located in byte 3 (LGA), defining a one-byte logical address.

0100 A 2-byte EFLA is in the associated EFLA field, located in byte 1 (AA), defining a one-byte link address, and byte 3 (LGA), defining a one-byte logical address.

1000 A 3-byte EFLA is in the associated EFLA field, located in bytes 0 (DD) and 1 (AA), defining a two-byte link address (DD.AA), and byte 3 (LGA), defining a one-byte logical address.

1100 A 4-byte EFLA is in the associated EFLA field, located in bytes 0 (DD), 1 (AA), and 2 (PP), defining a three-byte link address (DD.AA.PP), and byte 3 (LGA), defining a one-byte logical address.

(j) Control-Unit Number (CUN) 320: This field specifies a number that is used to identify the control unit that is the object of the change control unit configuration command.

(k) Control-Unit-Interface Protocol (CUIP) 322: This field specifies the type of protocol used by the specified control unit to communicate on the attaching I/O-interfaces.

(l) Channel-Path-Identifier Validity (CHPIDV) 326: This field specifies which of the CHPID and EFLA fields (if applicable) contain valid information. Bits 0–7 of the CHPIDV field correspond, from left to right, to each of the eight CHPID fields. When one, a CHPIDV bit specifies that the corresponding CHPID field contains a valid channel-path identifier.

When the OC field specifies the add operation, or the OC field specifies the modify operation and the OCQ field specifies add or delete channel-path access, the CHPIDV field is not to contain all zeros and the corresponding CHPID fields contain valid information; otherwise, the contents of the CHPID fields are ignored.

When the CHPID fields contain valid information and the corresponding channel paths are serial-I/O type, fibre-channel, fibre-channel-converted or fiber-extended channels, the corresponding EFLA fields contain valid information; otherwise, the contents of the EFLA fields are ignored.

(m) Channel-Path Identifier (CHPID) 330: This field includes up to eight channel-path identifiers. Each CHPID field that is specified as being valid by the contents of the CHPIDV field includes a unique channel-path identifier of a channel path that can be used to access the specified control unit.

The order in which channel paths (other than preferred channel paths) are selected by the channel subsystem to access I/O-devices that are attached to the specified control unit is model dependent.

When the CPC is operating in LPAR mode, for a given I/O-configuration definition, all of the channel paths to which a control unit is attached are to be sharable, or all of the channel paths are not to be sharable.

(n) Extended Full Link Address (EFLA0–7, for example) 332: This field includes up to eight four-byte extended full link addresses (EFLA) for the specified control unit. Each four-byte EFLA corresponds, one-for-one, with the CHPID field that is in the same relative position in the command request block. The EFLA fields have meaning when the control-unit is attached to a type of channel path that uses an interface protocol that requires use of a link address, a logical address, or both.

A full link address is the information that is contained in the destination-address field of frames that are received by the specified control unit, and in the source-address field of frames that are sent by the specified control unit.

Figure 3B:
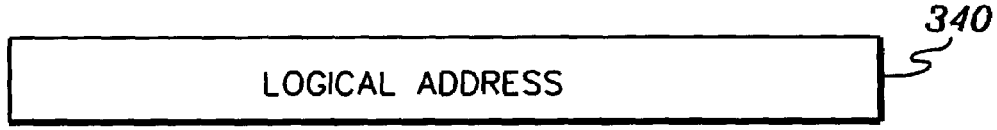
FIGS. 3b–3e depict examples of full link addresses, in accordance with an aspect of the present invention.

The contents of a one-byte full-link address in an EFLAn field, when the corresponding EFVn is 0000 binary, include, for instance, a logical address 340 (FIG. 3b) of the specified control unit on the specified channel path.

Figure 3C:
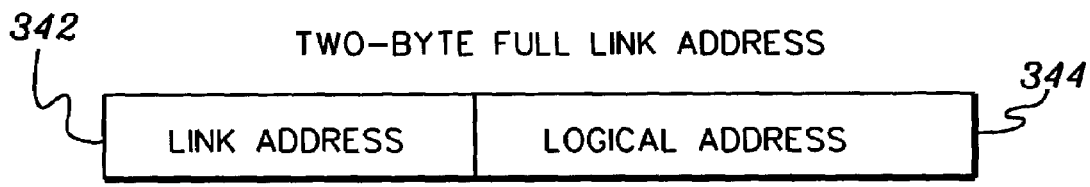

The contents of a two-byte full-link address in an EFLAn field, when the corresponding EFVn is 0100 binary, include, for example, a link address 342 (FIG. 3c), described below, and a logical address 344.

Figure 3D:
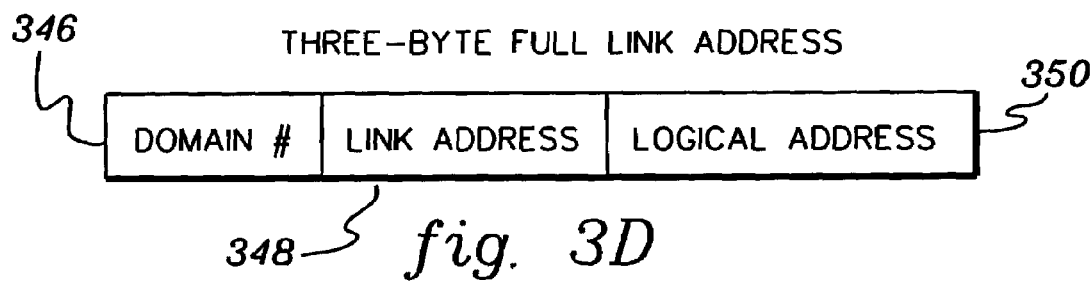
Figure 3E:
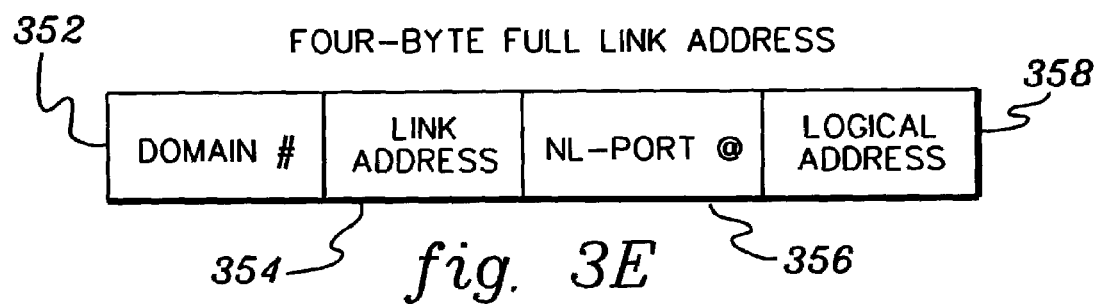

The contents of a three-byte full-link address in an EFLAn field, when the corresponding EFVn is 1000 binary, include, for instance, a domain # 346 (FIG. 3d) (a.k.a., switch address) for the specified control unit on the specified channel path, a link address 348, and a logical address 350.

The contents of a four-byte full-link address in an EFLAn field, when the corresponding EFVn is 1100 binary, include, for instance, a domain # 352, a link address 354, a NL-Port@ 356, which is the arbitrated-loop NL-port address that is established based upon the channel-path type of the specified control unit on the specified channel path, and a logical address 358.

The link address is established based upon the channel-path type of the specified channel path, as follows, in one embodiment:

Serial channel, defined without a switch-A valid link address is in the range of, for instance, 00–FE hex. A value of 00 hex is interpreted by the channel subsystem to mean that the channel subsystem is to select a link address for the specified control unit on the specified channel path. Otherwise, the value contained in the link-address field is used.

Serial channel, or fiber-extended channel (byte or block), defined with a switch-A valid link address is in the range of, for instance, 01–FE hex.

Fibre-channel converted channel-A valid link address in the range of, for instance, 01–FE hex.

Fibre-channel channel, defined without a switch-A valid link address is in the range of, for instance, 00–FF hex, and is determined by a technique of the fibre-channel (FC-FS) standard, not the I/O-configuration definition.

Fibre-channel channel, defined with a switch-A valid link address is in the range of, for instance, 00–FF hex.

(o) Unit Addresses 334 (FIG. 3a): This field describes the I/O-device unit addresses that are recognized by the control unit. A unit address includes, for instance, an Entry Type (ET) that includes a code that specifies the contents of the unit address. For example, when the entry type is equal to 1, the unit address field defines a single unit address, included in the field, that is recognized by the control unit.

As a further example, when the entry type is equal to 2, the unit address field defines a range of unit addresses that are recognized by the control unit. The unit address field includes a unit address, which determines the beginning of the range, and a count parameter of the unit address field specifies one less than the number of consecutive unit addresses that make up the range.

Figure 3F:
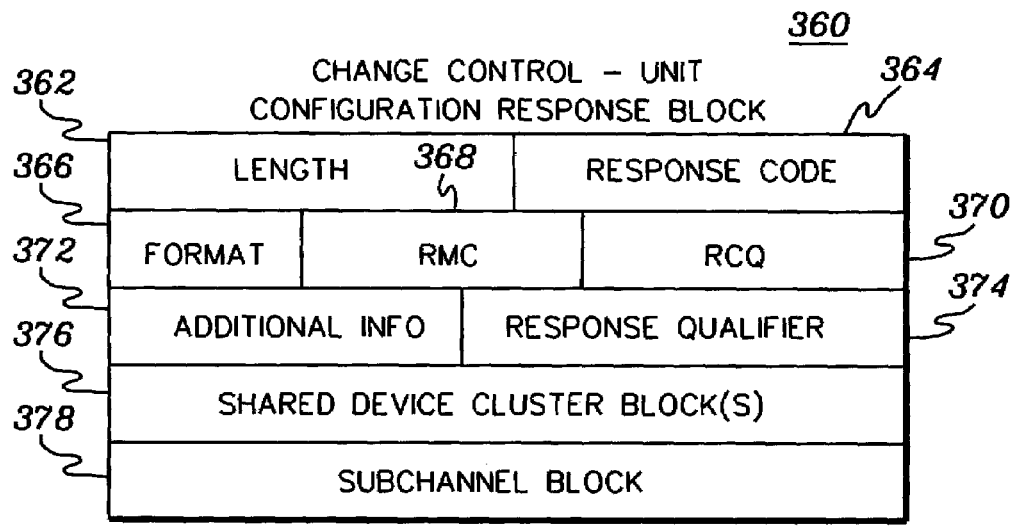
FIG. 3f depicts one embodiment of a response block for the change control unit configuration command of FIG. 3a, in accordance with an aspect of the present invention.

In one embodiment, a command response block 360 (FIG. 3f) for a Change Control Unit Configuration command includes, for instance, the following:

(a) Length Field 362: This field specifies the length of the command response block. The length depends on the response code that is stored in the response-code field as a result of the attempt to execute the change control unit configuration command.

When a response code indicating success is stored in the response code field, as one example, eight 16-byte shared-device-cluster (SDC) blocks are stored and one or more eight-byte subchannel blocks may be stored in the response data area of the response block. Thus, length field 362 specifies a command response block length of 144 bytes, plus eight bytes for every subchannel block (if any) that is stored.

When a response code other than an indication of success is stored in the response code field, no SDC blocks or subchannel blocks are stored as a result of the attempt to execute the command, and length filed 362 specifies a length of, for instance, eight bytes for the command response block.

(b) Response Code 364: This field includes an unsigned binary integer that describes the results of the attempt to execute the change control unit configuration command.

(c) Format (FMT) 366: The command-response-format field includes an unsigned integer whose value specifies the layout of the command-response block. In one example, this value is zero.

(d) Response-Modifier Code (RMC) 368: This field includes an unsigned integer that may provide additional information when the response code is other than an indication of success. The content of the RMC field is distinctive to each response code value. Not all response codes use the RMC field.

When the response code is a prespecified value, the RMC field contains an 8-bit mask used to indicate a corresponding CHPIDV bit position that specified a valid channel path that failed the link-address size check. RMC may have one or more bits set to one. Depending upon the model, not necessarily all RMC bits are set, when multiple channel paths have such a mismatch condition.

(e) Response-Code Qualifier (RCQ) 370: This field may contain a model dependent value that can be used to further describe the condition specified by the response code.

(f) Additional Information (A) 372: When one, this field specifies that the channel subsystem has additional subchannel blocks that cannot be contained in this command response block. When zero, it specifies that the channel subsystem has no subchannel blocks in addition to those, if any, that are contained in this command response block.

(g) Response Qualifier (RQ) 374: When the response-code field indicates that the requested configuration change has occurred, the response-qualifier field contains a value that provides information about conditions associated with that change. The meaning of each value is, for instance, as follows:

0 There are no special conditions associated with the configuration change.

1 The information provided by the program for the configuration change does not match the physical configuration.

(h) Shared-Device-Cluster (SDC) Blocks 376: This field includes one or more shared-device-cluster (SDC) blocks. Each SDC block that is specified as being valid describes a shared device cluster that contains one or more I/O-devices that are described as being attached to the control unit specified in the command request block of the change control unit configuration command that caused the SDC block to be created.

A shared device cluster is either a single control unit that can provide access to at least one I/O device, but does not share access to I/O devices with any other control unit, or it can be a collection of control units and I/O devices that are connected in such a way that for any division of the total collection of control units into two subsets, at least one I/O device is shared by at least one control unit from each subset.

Figure 3G:
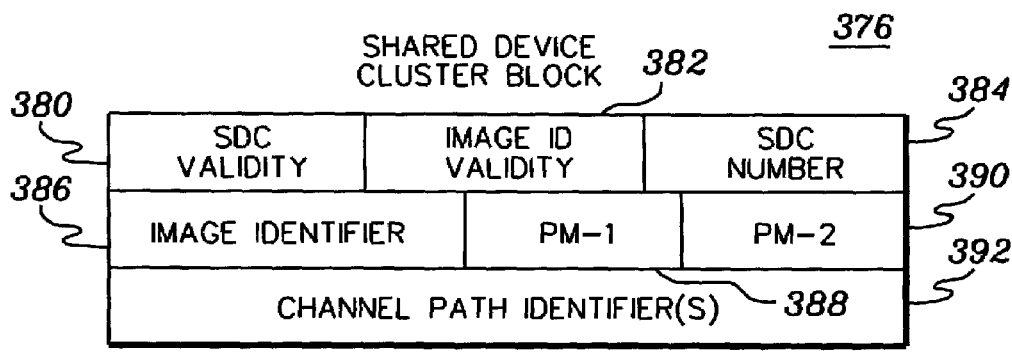
FIG. 3g depicts further details regarding a shared device cluster block of the response block of FIG. 3f, in accordance with an aspect of the present invention.

One example of an SDC block is described with reference to FIG. 3g. An SDC block 376 includes, for instance, the following:

(aa) SDC Validity Bit (S) 380: When one, this bit specifies that the associated SDC block is valid. When zero, this bit specifies that the associated SDC block is not valid and there are no subsequent SDC blocks in the command response block that are valid.

(bb) Image ID Validity Bit (P) 382: When one, this bit specifies that the image ID field contains a valid MIF image identification code. When zero, this bit specifies that the contents of the image ID field are meaningless. The P bit can be one, when the CPC is operating in LPAR mode. When the SDC is associated with shared channel paths, this bit is set to zero.

(cc) Shared Device Cluster (SDC) Number 384: This field includes an SDC number that identifies the shared device cluster described by this SDC block. Within an I/O configuration definition, every SDC has a unique number.

(dd) MIF-Image ID (IID) 386: When the CPC is operating in LPAR mode and the P bit is one, this field includes the MIF-image identification (IID) code associated with the logical partition from which the specified SDC is recognized.

(ee) Path Mask-1 (PM-1) 388: This field specifies the CHPID fields that identify the channel paths that are described in the I/O-configuration definition for the specified SDC. Each bit of the PM-1 field corresponds one-for-one, by relative position, with each of the CHPID fields. A PM-1 bit stored as one specifies that the contents of the corresponding CHPID field identifies a channel path for the specified SDC. A PM-1 bit stored as zero specifies that the contents of the corresponding CHPID field have no meaning.

(ff) Path Mask-2 (PM-2) 390: When the CPC is operating in LPAR mode, this field specifies the CHPID fields that identify the channel paths that are configured to the specified logical partition for the specified SDC. Each bit of the PM-2 field corresponds one-for-one, by relative position, with each of the CHPID fields. A PM-2 bit stored as one specifies that the contents of the corresponding CHPID field identifies a channel path for the specified SDC and the specified logical partition. A PM-2 bit stored as zero specifies that the contents of the corresponding CHPID field have no meaning.

A PM-2 bit can be one, if the corresponding bit of the PM-1 field is one. When the CPC is operating in LPAR mode and the specified channel paths are shared channel paths, the contents of the PM-2 field have no meaning. When the CPC is operating in basic mode, the contents of PM-2 field have no meaning.

(gg) Channel-Path Identifiers (CHPIDs) 392: This field includes, for instance, eight CHPID fields. The CHPID fields that correspond to the bits of the PM-1 field that are ones contain the CHPIDs of channel paths for the specified SDC. The contents of CHPID fields that correspond to the bits of the PM-1 field that are zero are meaningless.

(i) Subchannel Blocks 378 (FIG. 3f): When the length field contains a value greater than a predetermined value (e.g., 0090 hex), this field includes one or more subchannel blocks. Each subchannel block describes a subchannel that is affected by the requested change to the I/O configuration.

Figure 3H:
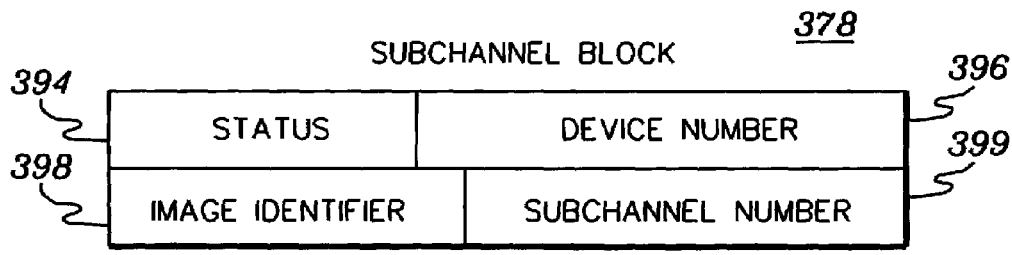
FIG. 3h depicts further details regarding a subchannel block of the response block of FIG. 3f, in accordance with an aspect of the present invention.

One example of a subchannel block is described with reference to FIG. 3h. A subchannel block 378 includes, for instance:

(aa) Status 394: This field includes information about the status of the corresponding I/O-device.

(bb) Device Number 396: This field includes a binary representation of the device number for the I/O-device that is associated with the specified subchannel.

(cc) MIF-Image ID (IID) 398: When the CPC is operating in LPAR mode and a prespecified bit of the status field is one, this field includes the MIF image-identification (IID) code associated with the logical partition with which the specified subchannel is associated. Otherwise, the contents of the IID field have no meaning.

(dd) Subchannel Number 399: This field specifies the subchannel to which the information in this subchannel block applies.

In addition to the above described dynamic I/O command that has been extended to support cascading, the following commands are also extended including, for instance, a Store Channel Subsystem Characteristics Command, a Store Channel Path Description command, a Store Subchannel Description command and a Store Event Information command, each of which is described below.

The Store Channel Subsystem Characteristics command is used to store information about the characteristics of the channel subsystem and has been revised to indicate whether the CPC has the FICON cascade facility installed. The execution of the Store Channel Subsystem Characteristics command does not change any information contained in the channel subsystem. The Store Channel Subsystem Characteristics command is executed synchronously and is not interpretively executed.

Figure 4A:
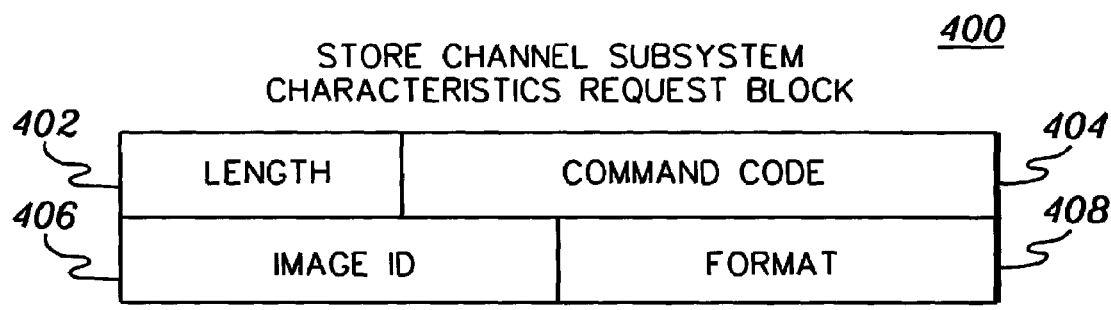
FIG. 4a depicts one embodiment of a request block for a store channel subsystem characteristics command, in accordance with an aspect of the present invention.

One embodiment of a request block for a Store Channel Subsystem Characteristics command is described with reference to FIG. 4a. In one example, a command request block 400 for a Store Channel Subsystem Characteristics command includes for instance:

(a) Length Field 402: This field specifies the length of the command request block.

(b) Command Code 404: This field specifies the Store Channel Subsystem Characteristics command.

(c) MIF Image Id (IID) 406: The IID field includes zeros, as one example.

(d) Format 408: The command request format field includes an unsigned integer whose value specifies the layout of the command request block. In one example, this value is zero.

Figure 4B:
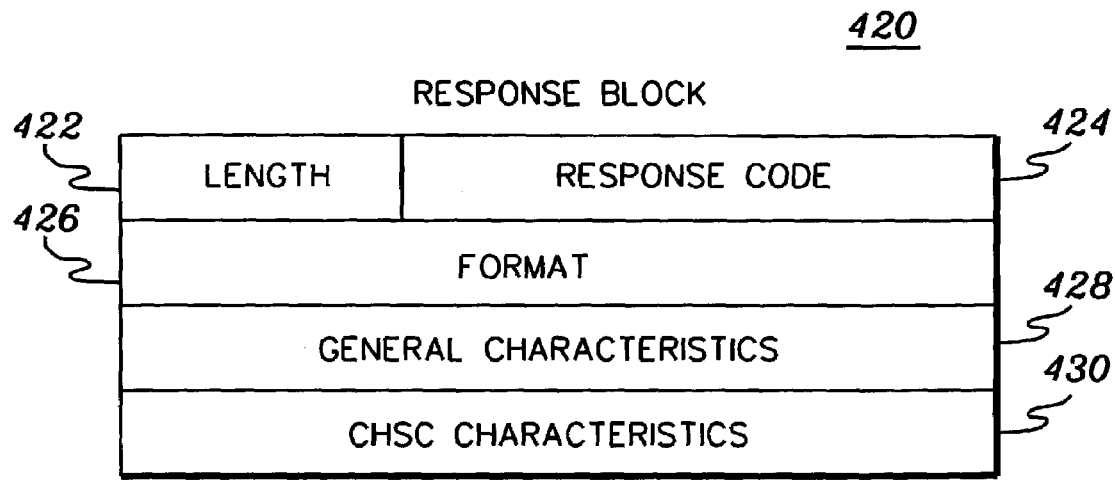
FIG. 4b depicts one embodiment of a response block for the store channel subsystem characteristic command, in accordance with an aspect of the present invention.

One embodiment of a response block for a Store Channel Subsystem Characteristics command is described with reference to FIG. 4b. In one example, a Store Channel Subsystem Characteristics response block 420 includes the following:

(a) Length Field 422: This field specifies the length of the command response code that is stored as a result of an attempt to execute the store channel subsystem characteristics command.

If a response code other than an indication of success is stored in the response code field, no characteristics information is stored as a result of the attempt to execute the command, and the length field specifies a length of, for instance, 8 bytes, for the command response block.

If a response code indicating success is stored in the response code field, both general characteristics and CHSC command characteristics are stored in the command response block. Thus, the length field specifies a command response block length of, for instance, 4,080 bytes.

(b) Response Code 424: This field includes an unsigned binary integer that describes the results of the attempt to execute the store channel subsystem characteristics command.

(c) Format 426: The command response format field includes an unsigned integer whose value specifies the layout of the command response block. In one example, this value is zero.

(d) General Characteristics 428: If a response code indicating success is stored in the response code field, the general characteristics field includes information that specifies which of a variety of facilities are provided by the channel subsystem. Some facilities include, for instance, Cancel Subchannel; Multiple Image Facility; Duplicate Device Numbers Facility; CHSC Subchannel; Dynamic I/O Configuration Facility; LPAR Mode; Dynamic CHPID Management Facility; Fiber-Channel Channel Facilities; FICON CTC Control Unit Facility; FICON Cascaded Switch Facility, etc. Although various facilities are described herein, other or different facilities may exist. When a bit of the general characteristics field corresponding to a particular facility is one, it indicates that the facility is provided.

(e) CHSC Characteristics 430: If a successful response code is stored in the response code field, the CHSC characteristics field includes information that specifies whether certain CHSC commands are provided by the channel subsystem. Examples of these commands include, for instance, Change Control Unit Configuration, Store Channel Path Description, Store Subchannel Description, and Store Event Information, as well as others. When a bit of the CHSC characteristics field corresponding to a particular command is one, that command is provided.

Another command revised is a Store Channel Path Description command, which is used to obtain the link addresses that are assigned to the channel link level facilities of a specified range of channel paths. Execution of the Store Channel Path Description command does not change any information contained in the channel subsystem. The Store Channel Path Description command is executed synchronously and can be interpretively executed.

The Store Channel Path Description command is now able to return a requested range of extended channel path description blocks (CPDB), in which each CPDB includes, for instance, the following information for a FICON cascade channel path: the link address size on the channel path; the 1-, 2-, or 3-byte link address of the fabric entry switch (i.e., the nearest switch directed to on the channel path); and the 1-, 2, or 3-byte link address of the channel path itself (i.e., the destination address to which any data transmitted from a control unit to the CPC via the channel path is sent).

Figure 5A:
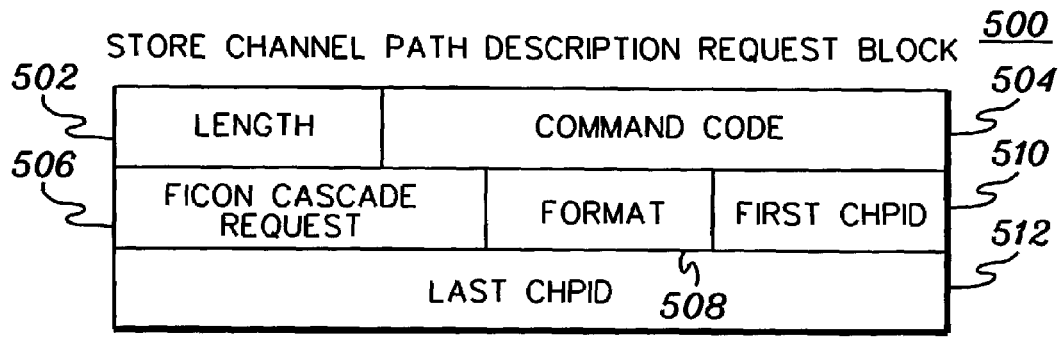
FIG. 5a depicts one embodiment of a request block for a store channel path description command, in accordance with an aspect of the present invention.

One embodiment of a request block for a Store Channel Path Description command is described with reference to FIG. 5a. In one example, a command request block 500 for a Store Channel Path Description command includes:

(a) Length Field 502: This field specifies the length of the command request block.

(b) Command Code 504: This field specifies the Store Channel Path Description command.

(c) FICON Cascade Request (C) 506: When the FICON cascaded switch facility is provided by the CPC, then when this field is one, it specifies that the request is for FICON cascade level of information that uses a format 1 command response block. When this field is zero, the request is for 2-byte full-link address information that uses a format 0 command response block.

(d) Format (FMT) 508: The command request format field includes an unsigned integer whose value specifies the layout of the command request block. In one example, this field is zero.

(e) First CHPID 510: This field specifies the CHPID identifying the first channel path for which information is requested.

(f) Last CHPID 512: This field specifies the CHPID identifying the last channel path for which information is requested. The value for the last CHPID is equal to or greater than the value for the first CHPID.

Figure 5B:
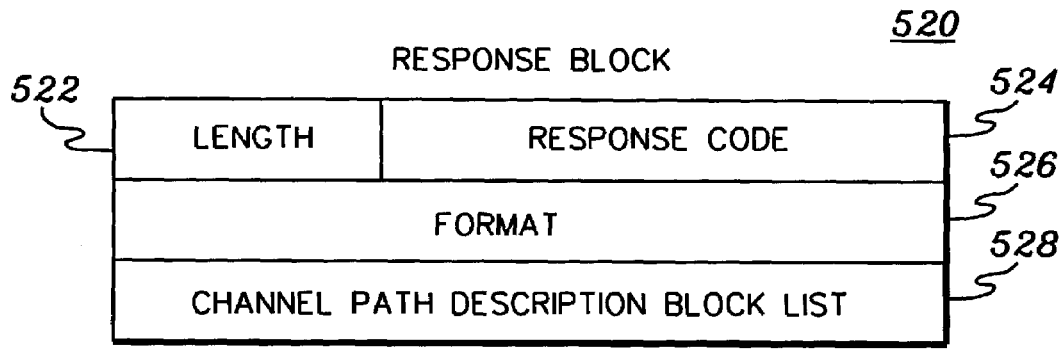
FIG. 5b depicts one embodiment of a response block for the store channel path description command, in accordance with an aspect of the present invention.

One embodiment of a response block for a Store Channel Path Description command is described with reference to FIG. 5b. In one example, a Store Channel Path Description response block 520 includes the following:

(a) Length Field (522): This field specifies the length of the command response code that is stored as a result of the attempt to execute the Store Channel Path Description command.

If a response code other than an indication of success is stored in the response code field, no channel path description blocks are stored as a result of the attempt to execute the command, and length 522 specifies a length of, for instance, 8 bytes for the command response block.

If a response code indicating success is stored in the response code field, at least one channel path description block is stored in the command response block as a result of the attempt to execute the command, and length 522 specifies a command response block length of, for instance, 8 bytes plus 32 bytes for each of the format 1 channel path description blocks that are stored.

(b) Response Code 524: This field includes an unsigned binary integer that describes the results of the attempt to execute the Store Channel Path Description command.

(c) Format (FMT) 526: The command response format field includes an unsigned integer whose value specifies the layout of the command response block. The value of this field is, for instance, one. When the value of the field is one, the format of, for instance, a 32-byte format 1 channel path description block is used.

(d) Channel Path Description Block List 528: When a response code indicating success is stored, and the FMT field includes the value 1, up to, for instance, 127 32-byte format 1 channel path description blocks are stored in the channel path description block list of the command response block. The number of channel path description blocks stored depends on, for example: 1) the number of CHPIDs in the range specified in the command response block; 2) conditions in the channel subsystem when CHSC is executed; and 3) the channel subsystem model. At least one channel path description block is stored, and the actual number of blocks stored is determined by subtracting, for instance, 8 bytes from the size of the command response block and dividing the remainder by 32 (for a format 1 CPDB).

Channel path description blocks are stored for some or all of the specified CHPIDs, beginning with the CHPID specified by the first CHPID field. Channel path description blocks are stored sequentially in ascending order, in one example.

Figure 5C:
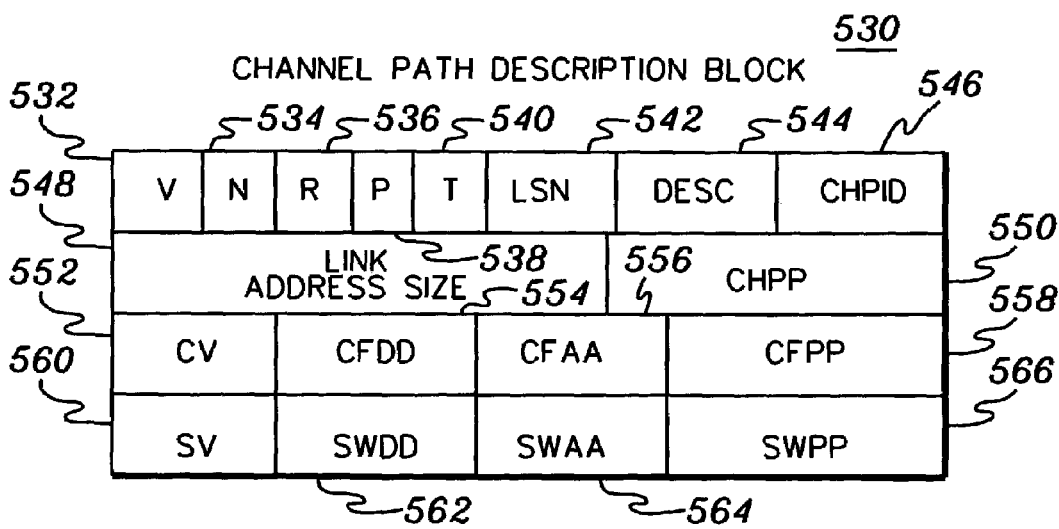
FIG. 5c depicts one embodiment of further details regarding a channel path description block of the response block of FIG. 5b, in accordance with an aspect of the present invention.

One example of a format 1 channel path description block is described with reference to FIG. 5c. Channel path description block 530 includes, for instance, the following:

(a) CHPID Valid Flag (V) 532: This field, when one, indicates that the specified CHPID is valid because it has been defined to the channel subsystem. This field, when zero, indicates that the specified CHPID is not valid because it has not been defined to the channel subsystem, and the contents of the remainder of the block, except for the contents of the CHPID field, have no meaning. A CHPID can be described to the channel subsystem, and therefore be considered valid, even though it is not physically installed on the CPC.

(b) Logical Switch Number Valid Flag (N) 534: This field, when one, indicates that the number in the logical switch number field is valid. When zero, this field indicates that a logical switch number has not been defined to the channel subsystem for the specified CHPID.

(c) Intrusion Responding Fabric (R) 536: This field, when one, indicates that the channel path connects to a fiber channel fabric entry switch of a fiber channel fabric that has the following characteristics:

If a fabric switch, having the same domain address (DDaapp), but a different worldwide name from an existing fabric switch, is introduced in the fabric (e.g., via E-Port cabling error), the fabric 1) recognizes the intruding switch, 2) prohibits communication (FC-FS layer) to the intruder and 3) reports the presence of the intruder by sending RLIR ELS to a registrant.

When performing RCSN reporting, the fabric uses correct address-format-and-event qualification for link, port and fabric failures.

(d) Channel Path Parameter (P) 538: When the dynamic CHPID management facility is provided by the CPC, and a CHPP value has been assigned to the specified CHPID, this field is one to indicate that the CHPP field contains a channel path parameter.

(e) Channel Path Type (T) 540: This field, when one, indicates that the channel path specified in the CHPID field can be accessed by more than one MIF image without the need to reconfigure the channel path to allow such access. When zero, this field indicates that the channel path specified in the CHPID field can be accessed by only one MIF image, unless the channel path is reconfigured to allow access by a different MIF image.

(f) Logical Switch Number (LSN) 542: This field indicates the logical switch number of the switch, if any, that is attached through the corresponding channel path link address.

(g) Descriptive Field (DESC) 544: This field provides a description of the channel path that is associated with the specified CHPID (h) CHPID 546: This field specifies the CHPID of the channel path to which the information in this channel path description block applies.

(i) Link Address Size (AS) 548: This field includes an unsigned integer that specifies the link address size defined for the channel path. When defined, the size of a link address is, for instance, in the range 1–3.

0 Link address size is not defined.

1 Link address size is one. Such a link-address is represented in byte 1 of an EFLA field.

2 Link address size is two. Such a link-address is represented in bytes 0–1 of an EFLA field.

3 Link address size is three. Such a link-address is represented in bytes 0–2 of an EFLA field.

When the link address size of a channel path is defined, any control unit added to the channel path that is not the first control unit on the channel path is to use a link address of the same size. The link address size of a channel path is not defined when the channel path does not have any control units defined.

(j) Channel Path Parameter (CHPP) 550: When the P bit is one, this field includes an unsigned binary integer which is a channel path parameter for the specified CHPID.

(k) CV 552: This field is an unsigned integer whose value is used to indicate the validity of the CFDD, CFAA, and CFPP fields.

(l) CFDD 554: When CV is, for instance, 2 or 3, CFDD includes a switch address (a.k.a., domain number) in the range 0–255, as one example. It may be used as part of the destination address by control units, when attempting to communicate with a channel subsystem on the specified channel path.

(m) CFAA 556: When CV is, for instance, 1, 2, or 3, CFAA includes one of the following:

An area number in the range 0–255, as one example, associated with the channel path designated by the CHPID.

A link number in the range 0–255, as one example, associated with the channel path designated by the CHPID.

It may be used as part of the destination address by control units, when attempting to communicate with the channel subsystem on the specified channel path.

(n) CFPP 558: When CV is, for instance, 3, CFPP includes a port (a.k.a., N_port) number in the range 0–255, as one example, associated with the channel path designated by the CHPID. It may be used as part of the destination address by control units, when attempting to communicate with the channel subsystem on the specified channel path.

(o) SV 560: SV is an unsigned integer whose value is used to indicate the validity of the SWDD, SWAA, and SWPP fields, which collectively describe the destination address of the fabric-entry switch on a channel path. A fabric-entry switch is the first switch encountered from an N_Port that communicates via the fabric.

(p) SWDD 562: When SV is, for instance, 2, or 3, SWDD includes a switch address (a.k.a., domain number) in the range 0–255, as one example. It may be used to help determine the destination switch port address, when attempting to communicate with the control-unit port (CUP) of the fabric-entry switch on the specified channel path.

(q) SWAA 564: When SV is, for instance, 1, 2, or 3, SWAA includes an area (F-port(s), FL-port, loop) number or link address in the range 0–255, as one example. It may be used as part of the destination switch port address, when attempting to communicate with the control-unit port (CUP) of the fabric-entry switch on the specified channel path.

(r) SWPP 566: When SC is, for instance, 3, SWPP includes a port (a.k.a., N_Port, NL-port) number in the range 0–255, as one example. It may be used as part of the destination switch port address, when attempting to communicate with the control-unit port (CUP) of the fabric-entry switch on the specified channel path.

The link address bytes represented by the collection of the CFDD, CFAA and CFPP fields, and also by the collection of the SWDD, SWAA, and SWPP fields, at a minimum, each reflects the applicable contents in the I/O configuration definition.

Another command updated is the Store Subchannel Description command, which is used to obtain the link addresses that are assigned to the control unit link level facilities associated with a specified range of subchannels. The Store Subchannel Description command provides up to 8 channel path description blocks for each subchannel in a range of specified subchannels.

When the CPC is operating in LPAR mode, the Store Subchannel Description command is used to obtain the link addresses that are assigned to the control unit link level facilities associated with the specified range of subchannel images configured to the logical partition that executed the command. Information for subchannel images configured to other logical partitions, if any, is not provided.

The execution of the Store Subchannel Description command does not change any information contained in the channel subsystem. The Store Channel Subsystem command is executed synchronously and can be interpretively executed.

Figure 6A:
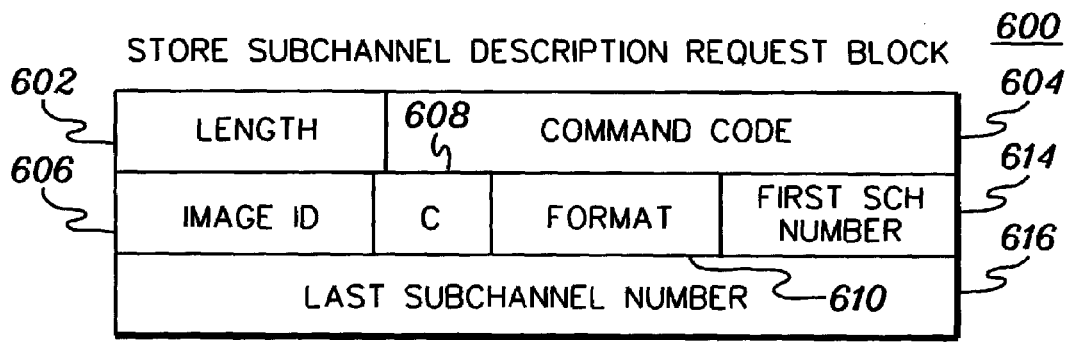
FIG. 6a depicts one embodiment of a request block for a store subchannel description command, in accordance with an aspect of the present invention.

One embodiment of a request block for a Store Subchannel Description command is described with reference to FIG. 6a. In one example, a command request block 600 for a Store Subchannel Description command includes:

(a) Length Field 602: This field specifies the length of the command request block.

(b) Command Code 604: This field specifies the Store Subchannel Description command.

(c) MIF-Image ID (IID) 606: If in LPAR mode, the IID field is provided and is to include zeros, as one example.

(d) FICON Cascade Request (C) 608: When the FICON cascaded switch facility is provided by the CPC, then when one, this field specifies that the request is for a FICON cascade level of information that includes a format 1 command response block and subchannel description block. When C is zero, the request is for, for instance, 2-byte full-link address information that includes a format 0 command response block and subchannel description block.

(e) Format (FMT) 610: The command request format field includes an unsigned integer whose value specifies the layout of the command request block. In one example, this value is zero.

(f) First Subchannel Number 614: This field specifies the subchannel number identifying the first subchannel for which information is requested.

(g) Last Subchannel Number 616: This field specifies the subchannel number identifying the last subchannel for which information is requested.

Figure 6B:
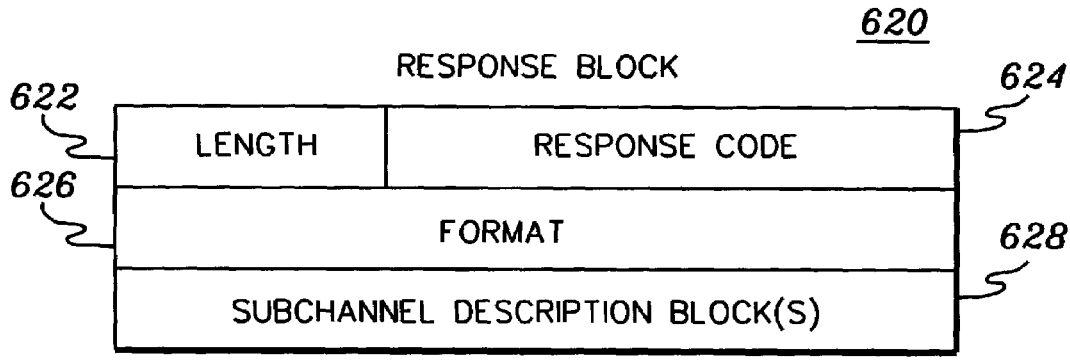
FIG. 6b depicts one embodiment of a response block for the store subchannel description command, in accordance with an aspect of the present invention.

One embodiment of a response block for a Store Subchannel Description command is described with reference to FIG. 6b. In one example, a Store Subchannel Description command response block 620 includes the following:

(a) Length Field 622: This field specifies the length of the command response code that is stored as a result of the attempt to execute the Store Subchannel Description command.

If a response code other than an indication of success is stored in the response code field, no subchannel description blocks are stored as a result of the attempt to execute the command, and length 622 specifies a length of, for instance, 8 bytes for the command response block.

If a response code indicating success is stored in the response code field, at least one subchannel description block is stored in the command response block as a result of the execution of the command, and length 622 specifies a command response block length of, for instance, 8 bytes plus 128 bytes for each of the subchannel description blocks that are stored, when the FICON cascaded switch facility is provided by the CPC.

(b) Response Code 624: This field includes an unsigned binary integer that describes the results of the attempt to execute the Store Subchannel Description command.

(c) Format (FMT) 626: The command response format field includes an unsigned binary integer whose value specifies the layout of the command response block. The value of this field is, for instance, one. When the value of the field is one, one or more format-1 subchannel description blocks are placed into the command response block.

(d) Subchannel Description Blocks 628: When a successful response code is stored, up to 31 format-1 subchannel description blocks are stored in the response data area of the command response block. The number of subchannel description blocks stored depends on the number of subchannels in the range specified in the command response block, conditions in the channel subsystem when CHSC is executed, and the channel subsystem model. At least one subchannel description block is stored, and the actual number of blocks stored is determined by subtracting, for instance, 8 bytes from the size of the command response block and dividing their remainder by 128, when format-1 subchannel description blocks are stored.

Subchannel description blocks are stored for some or all of the specified subchannels, beginning with the subchannels specified by the first subchannel number field. Subchannel description blocks are stored, for instance, in ascending order of subchannel numbers.

Figure 6C:
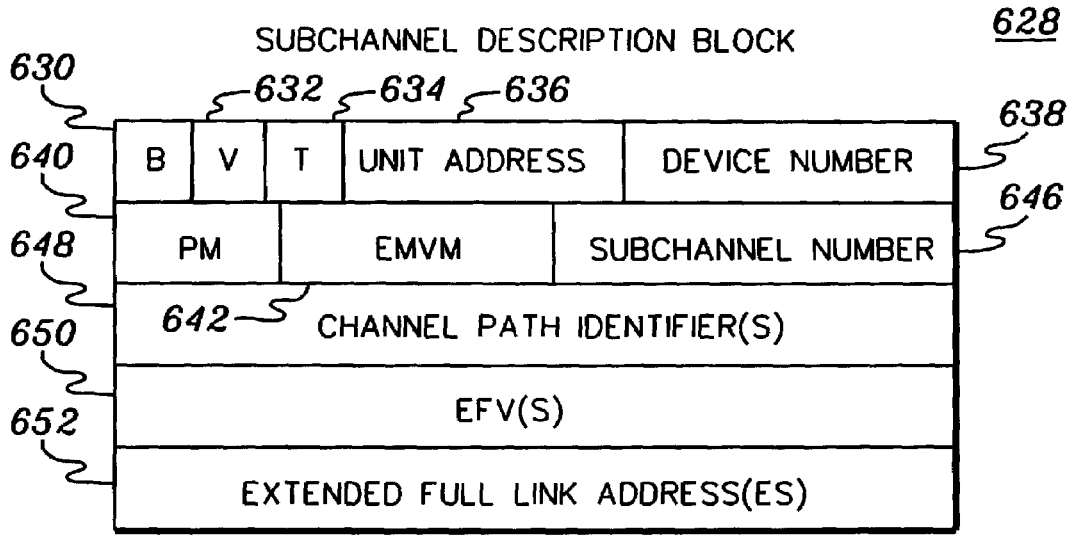
FIG. 6c depicts one embodiment of further details regarding a subchannel description block of the response block of FIG. 6b, in accordance with an aspect of the present invention.

One example of a format-1 subchannel description block 628 is described with reference to FIG. 6c. In one example, the block includes, for instance, the following:

(a) Subchannel Valid (B) 630: This field, when one, indicates that the specified subchannel is valid, because it has been defined to the channel subsystem image. When zero, it indicates that the specified subchannel is not valid because it has not been defined to the channel subsystem image, that the contents of the remainder of the block, except for the subchannel number field, have no meaning, and that the device-number-valid bit for any subchannel number greater than the indicated subchannel number is stored as zero.

(b) Device Number Valid (V) 632: This field, when one, indicates that the device-number field (see below) contains a valid device number and a device associated with the specified subchannel may be physically installed. When zero, it indicates that there is no device currently associated with the specified subchannel or that the logical partition hypervisor is preventing the specified subchannel from being visible to the program executing a logical partition.

(c) Subchannel Type (T) 634: This field specifies the subchannel type. The contents of the subchannel description block are dependent upon the value of the T field. The T values are defined, for instance, as follows:

T Type Definition

0 I/O subchannel: For an I/O subchannel, all fields of the subchannel-description block may have meaning.

1 CHSC subchannel: For a CHSC subchannel, the subchannel-valid (B) bit, the subchannel type field, and the subchannel-number field of the subchannel description block have meaning. All other fields have no meaning.

2 Message Subchannel: For a message subchannel, all fields of the subchannel description block except the unit-address field may have meaning.

(d) Unit Address 636: When the subchannel type field contains a value of zero, indicating that the subchannel is an I/O subchannel, and when a Duplicate Device Numbers Facility of the general-characteristics field (in the response block for the Store Channel Subsystem Characteristics command) is one, this field includes the unit address of the I/O device associated with the specified subchannel. When the Duplicate Device Numbers Facility of the general-characteristics field (in the response block for the Store Channel Subsystem Characteristics command) is zero, the contents of this field have no meaning.

(e) Device Number 638: This field includes the binary representation of the hexadecimal four-digit device number of the device that is associated with the specified subchannel. The device number is the parameter that is unique in the central-processing complex (not in LPAR mode) or unique in a logical partition (in LPAR mode).

(f) Path Mask (PM) 640: This field indicates the validity of the CHPIDs (see below) for those channel paths defined for the device associated with the specified subchannel. Each bit of the PM field corresponds one-for-one, by relative bit position, with a CHPID. A PM bit stored as one indicates that the corresponding CHPID field is valid. A PM bit stored as zero indicates that the corresponding CHPID field is not valid.

(g) EFLA Master Validity Mask (EMVM) 642: This field indicates the validity of the extended full-link address field. Each bit of the EMVM corresponds one-for-one, by relative position, with an extended full-link address validity field (EFV), and with an extended full-link address field. An EMVM bit stored as one indicates that the corresponding EFV and EFLA fields are valid. The detail of an EFLA field is determined by its corresponding EFV validity field. An EMVM bit stored as zero indicates that the corresponding fields are not valid.

(h) Subchannel Number 646: This field specifies the subchannel to which the information in the subchannel description block applies.

(i) Channel Path Identifiers (CHPIDs) 648: This field includes, for instance, eight 1-byte CHPIDs corresponding to bits 0–7 of the PM field. A CHPID is valid if the corresponding PM bit is one. Each valid CHPID includes the identifier of a physical channel path to the associated I/O device. When the subchannel type field specifies an I/O subchannel, the set of valid CHPIDs reflect the full complement of channel paths defined for the associated I/O device, regardless of whether those channel paths are currently available. When the subchannel type field specifies a message subchannel, the set of valid CHPIDs reflects the set of available channel paths for the associated I/O device.

(j) Extended Full-Link Address Validity (EFVs) 650: This field includes, for instance, eight 4-bit validity fields. EFV0 is associated with EFLA0, and so forth. A 4-bit EFVn field has the following definition:

| Bits | Meaning |
|------|---------|
| 0000 | The associated EFLA field has one valid byte: byte 3 (LGA) contains a logical address. Zeros are stored in bytes 0–2. |
| 0100 | The associated EFLA field has two valid bytes: byte 1 (AA) contains a link address, and byte 3 (LGA) contains a logical address. Zeros are stored in bytes 0 and 2. |
| 1000 | The associated EFLA field has three valid bytes: byte 0 (DD) contains a domain (switch) address, byte 1 (AA) contains a link address, and byte 3 (LGA) contains a logical address. Zero is stored in byte 2. |
| 1100 | The associated EFLA field has four valid bytes: byte 0 (DD) contains a domain (switch) address, byte 1 (AA) contains a link address, byte 2 (PP) contains an arbitrated-loop NL-port address, and byte 3 (LGA) contains a logical address. |

(k) Extended Full-Link Addresses (EFLAs) 652: This field includes up to, for instance, eight 4-byte extended full-link addresses (EFLA) for the specified control unit. Each 4-byte EFLA corresponds, one for one, with the EMVM mask that is in the same relative position in the command request block. The EFLA fields have meaning when the control unit is attached to a type of channel path that uses an interface protocol that requires use of a link address, a logical address or both.

A full-link address is the information that is included in the destination address field of frames that are received by the specified control unit, and in the source address field of frames that are sent by the specified control unit. Described above are the contents of various full-link addresses.

Another command revised for cascading is a Store Event Information command, which is used to store event information that has been made pending by the channel subsystem. Normally, this command is executed as a result of the program having received an event information pending channel report. The execution of the Store Event Information command may change information contained in the channel subsystem. The Store Event Information command is executed synchronously and is not interpretively executed.

The Store Event Information command is upgraded to provide 1-, 2-, or 3-byte link address information associated with the control unit that is being signaled as available for use. This is an asynchronous notification to software and allows for dynamic addition of I/O equipment and real-time inclusion into the set of devices used by the software, such as the Intelligent Resource Director (IRD).

Figure 7A:
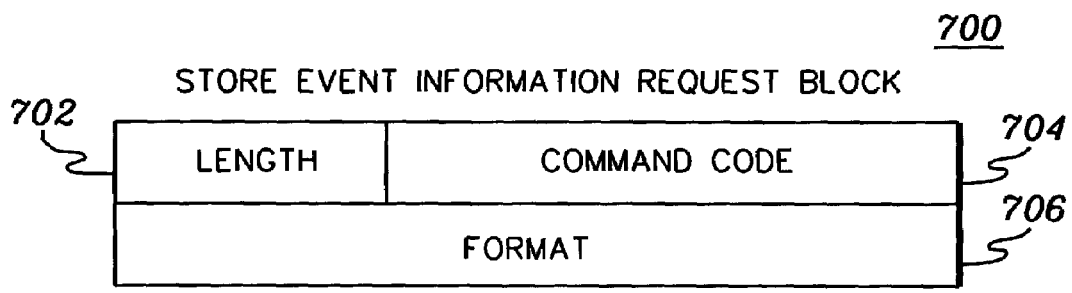
FIG. 7a depicts one embodiment of a request block for a store event information command, in accordance with an aspect of the present invention.

One embodiment of a request block for a Store Event Information command is described with reference to FIG. 7a. In one example, a command request block 700 for a Store Event Information command includes:

(a) Length Field 702: This field specifies the length of the command request block.

(b) Command Code 704: This field specifies the Store Event Information command.

(c) Format (FMT) 706: The command request format field includes an unsigned integer whose value specifies the layout of the command request block.

Figure 7B:
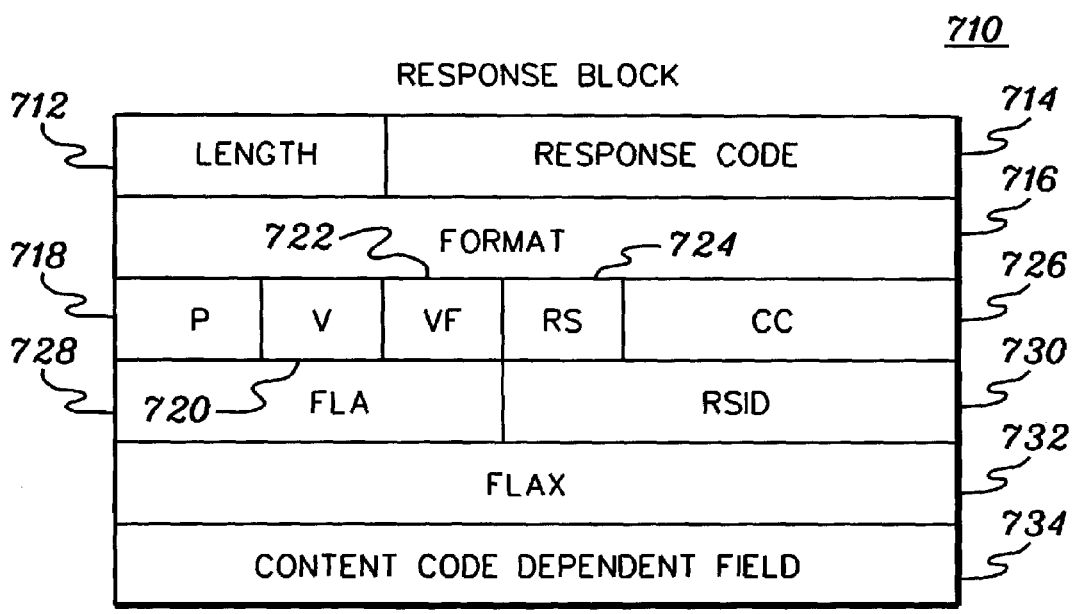
FIG. 7b depicts one embodiment of a response block for the store event information command, in accordance with an aspect of the present invention.

One embodiment of a response block for a Store Event Information command is described with reference to FIG. 7b. In one example, a Store Event Information response block 710 includes the following:

(a) Length Field 712: This field specifies the length of the command response code that is stored as a result of the attempt to execute the Store Event Information command.

If a response code other than an indication of success is stored in the response code field, no information is stored in the response data area and length 712 specifies a length of, for instance, 8 bytes for the command response block.

If a response code indicating success is stored in the response code field, event information is stored in the response data area. When FMT is zero, length 712 specifies a length of 24 bytes plus a value, which is dependent on the contents of the content code field.

(b) Response Code 714: This field specifies an unsigned binary integer that describes the results of the attempt to execute the Store Event Information command.

(c) Format (FMT) 716: The command response format field includes an unsigned integer who value specifies a layout of the command response block. In one example, this value is zero.

(d) P FLAG 718: This flag specifies that the channel subsystem has pending event information in addition to the information provided in response to this CHSC command. The program can obtain the additional information by executing the Store Event Information command again. When zero, this field specifies that the channel subsystem has no additional pending event information.

(e) V FLAG 720: When one, this flag specifies that the channel subsystem has recognized an overflow condition and event information has been lost. The overflow condition was recognized while the event information now contained in the response data area was the most recently pending information. The overflow does not affect the information contained in the response data area. When zero, this field specifies that channel subsystem has not recognized an overflow condition.

(f) Validity FLAG (VF) 722: This field indicates the validity of the information stored in specified fields of the response-data area. The meaning of bits 0–7 is, for instance, as follows:

| Bits | Meaning |
| --- | --- |
| 0 | When bit 0 is one, the FLA field includes valid information. When bit 0 is zero, the contents of the FLA field have no meaning. |
| 1 | When bit 1 is one and bit 0 is one, the FLA field includes a full link address (FLA). When bit 1 is zero and bit 0 is one, byte 0 of the FLA field includes a link address, and byte 1 of the FLA field has no meaning. |
| 2 | When bit 2 is one, byte 0 of the FLAX field is valid and includes a destination-switch address (a.k.a., domain number) in the range of, for instance, 0–255. |
| 3 | When bit 3 is one, byte 1 of the FLAX field is valid and includes an arbitrated-loop NL-port address in the range of, for instance, 0–255. |
| 7 | If in LPAR mode, when bit 7 is one, byte 0 of the RSID field contains a MIF-image ID (IID). |

(g) Reporting Source (RS) 724: This field includes an unsigned binary integer that specifies the type of information, if any, that is contained in the reporting-source-ID (RSID) field. One example of the values that can be specified and their meanings are as follows:

| Values | Meanings |
| --- | --- |
| 0 | The RSID field does not include valid information. |
| 1–2 | Reserved. |
| 3 | Subchannel Number: The RSID field includes a two-byte subchannel number. |
| 4 | CHPID: The RSID field includes a channel-path ID. Byte 0 of the RSID field contains zeros, and byte 1 of the RSID field contains a channel-path ID. |
| 5 | Adjunct-processor: The RSID field does not include valid information. |
| 6 | Control-unit number: The RSID field includes a control-unit number having, for instance, 4 hex digits. |

(h) Content Code (CC) 726: This field includes an unsigned binary integer that describes the type of information that is contained in the response-data area. The values that can be specified and their meaning are, for instance, as follows:

| Values | Meaning |
| --- | --- |
| 0 | Reserved. |
| 1 | Link-Incident Information: A link incident has been recognized for a self-describing-component (SDC) interface. The content-code-dependent field contains information describing the incident. |
| 2 | I/O-Resource-Accessibility Information: One or more I/O resources previously not accessible may have become accessible. |
| 3 | Adjunct-processor information: The accessibility of one or more APs has changed. |
| 4 | I/O-Priority Information: The channel-subsystem I/O-priority facility has either entered the operational state or the not-operational state, or the range of I/O-priority numbers that may be specified in the ORB when START SUBCHANNEL is executed has changed. When the I/O-priority facility is operational, the range of I/O-priority numbers that may be specified is contained in the content-code-dependent field. |

(i) Full Link Address (FLA) 728: This field may, depending on the event, include a link address or a full link address (FLA). The validity of the contents of the FLA field is specified by the contents of the VF field.

(j) Reporting-Source ID (RSID) 730: This field includes the reporting-source ID which may, depending on the event, identify a channel subsystem facility. The contents of the RSID field are determined by the contents of the RS field.

(k) Full-Link-Address Extension (FLAX) 732: When the FICON-cascaded switch facility is provided by the CPC, this field is an extension of the FLA field, in order to form, for instance, a 4-byte field whose use is defined by the VF field.

(l) Content-Code-Dependent Field (CCD) 734: For a format-0 response, this field may contain additional information about the event. If a response code indicating success is stored in the response-code field, the number of bytes of additional information, if any, can be determined by subtracting 24 bytes from the size of the format-0 command response block.

The Store Event Information command, as well as the other store commands described herein are used to provide information relating to the I/O configuration. This information includes information regarding channel paths, subchannels, and the channel subsystem, as examples.

Described in detail above is a capability for providing a predictable I/O configuration, in which the one or more peripheral units accessible by a program are explicitly defined, thereby providing a secure computing environment.

In one example, the I/O configuration is defined by a configuration program and/or by dynamic I/O commands. This configuration is often initially defined before any physical hardware is shipped to the customer's site. The program and commands enable a multi-byte (e.g., three byte) link address to be employed. For example, the 3-byte N_Port ID is mapped onto the classical configuration model, in which the 3-byte ID is considered as three fields in the form of DD AA PP. These fields are defined, for instance, as:

DD (Domain): Identifies the switch in the fabric, and is assigned by the customer.

AA (Area): Identifies the port on the selected switch, and is determined by the physical port on the switch.

PP (Port): Used for arbitrated loop, and is constant for N_Ports on the fabric, if arbitrated loop is not used.

Given this, three addressing modes are defined:

One Byte Addressing: The AA byte is specified by the customer. This mode supports a single switch fabric, and is provided for compatibility with older non-SAN-enabled FICON implementations. In this configuration, both the server and the target peripheral units are connected to the same switch, so that the server port builds the target's N_Port ID by using the DD and PP bytes from its own N_Port ID (obtained during the initialization process), together with the specified AA byte.

Two Byte Addressing: The DD and AA bytes are specified by the customer. This mode supports configurations which do not use arbitrated loop. This is provided so that the customer is not required to discover and enter the constant PP byte. The server port supplies the PP byte from its own ID, as above.

Three Byte Addressing: All 3 bytes are specified. This mode is used, if FC arbitrated loop is present in the configuration.

To support the above, the existing secure I/O definition tools are upgraded by expanding the existing one byte field to, for instance, three bytes, and by adding an additional field, in at least some cases, indicating which of the 3 bytes are valid. The addressing modes shown above are allowed to be mixed between server ports (channels). However, within a given server port, the targets are to be defined using the same mode to provide an added level of protection against integrity problems caused by definition errors.

Thus, advantageously, one or more aspects of the present invention enable old and new channel path types to be managed. For example, the same program and/or commands can be utilized for 1-, 2-, or 3-byte addressing, which helps minimize software impacts to Intelligent Resource Director (IRD) and dynamic I/O configuration management, while providing an increase in the scope of the set of managed devices. Such an increase in scope enables the management and accessibility of large Storage Area Networks.

Although one example of a computing environment is provided, this is only one example. Many other environments can incorporate and use one or more aspects of the present invention. For example, a computing environment that does not include logical partitions may incorporate and use one or more aspects of the present invention. For instance, one or more aspects of the present invention can be employed in a computing environment in which a server is connected to a peripheral unit via a fabric. The server can be any type of computing unit, and not necessarily a central processing complex.

Further, although the environment described herein is a Storage Area Network, other environments may also use one or more aspects of the present invention. For instance, an environment that includes local area networks, as well as others, may incorporate and use one or more aspects of the present invention.

Additionally, although an example of a peripheral unit has been provided, other types of peripheral units are possible, including, for instance, storage devices, another central processing complex, I/O devices, or any other types of units that attach to a fabric.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of providing input/output (I/O) configurations of a computing environment, said method comprising:
   explicitly pre-specifying in an I/O configuration data set which one or more peripheral units of a computing environment, comprising a switching network fabric and a plurality of peripheral units coupled thereto, are accessible by a program of the computing environment based on at least one human generated I/O configuration input statement, the I/O configuration data set providing a predictable, pre-specified I/O configuration for the program at initialization of the program, wherein the one or more peripheral units are accessible via a channel subsystem and the switching network fabric, the switching network fabric being separate from the channel subsystem and comprising a plurality of switches and links, the switching network fabric having autonomy over a choice of one or more links coupling one or more switches of the plurality of switches to define a path from the channel subsystem to a peripheral unit of the one or more peripheral units, wherein the program employs the switching network fabric to only access the one or more peripheral units accessible to it as defined in the pre-specified I/O configuration data set, and wherein the explicitly specifying comprises indicating an address for a peripheral unit of the one or more peripheral units, wherein the address comprises one portion that identifies an exit switch of the switching network fabric and another portion that identifies a port on that exit switch.

2. The method of claim 1, wherein the one or more peripheral units comprise at least one control unit.

3. The method of claim 1, wherein the program comprises an operating system.

4. The method of claim 3, wherein the operating system is located within a logical partition of the computing environment.

5. The method of claim 1, wherein the predictable I/O configuration facilitates a secure computing environment.

6. The method of claim 1, wherein the explicitly specifying comprises employing a configuration program to provide the address for a peripheral unit of the one or more peripheral units, wherein the address is a multi-byte address.

7. The method of claim 6, wherein said configuration program is also capable of supporting one-byte addressing for other I/O configurations.

8. The method of claim 1, wherein the explicitly specifying further comprises, after initialization of the program, employing human generated input data to issue a machine command to provide the address for a peripheral unit of the one or more peripheral units, wherein the address is a multi-byte address.

9. The method of claim 8, wherein said machine command is also capable of supporting one-byte addressing for other I/O configurations.

10. The method of claim 1, further comprising changing the predictable I/O configuration after initialization of the program, the changing being responsive to human generated input data.

11. The method of claim 10, wherein the changing comprises using a machine command, said machine command also being capable of changing an I/O configuration that does not have a fabric, even though addressing for the I/O configuration without a fabric is different than addressing for the I/O configuration with a fabric.

12. The method of claim 1, further comprising obtaining information relating to the predictable I/O configuration.

13. The method of claim 12, wherein the information comprises information associated with at least one of one or more channel paths of the predictable I/O configuration, one or more subchannels of the predictable I/O configuration, and a channel subsystem of the computing environment.

14. A system of providing input/output (I/O) configurations of a computing environment, said system comprising executable:
    means for providing a predictable I/O configuration for a program of a computing environment, comprising a switching network fabric and a plurality of peripheral units coupled thereto, at initialization of the program, said means for providing comprising:
        means for explicitly pre-specifying in an I/O configuration data set which one or more peripheral units of the computing environment are accessible by the program of the computing environment based on at least one human generated I/O configuration input statement, the I/O configuration data set providing the predictable I/O configuration for the program at initialization of the program, wherein the one or more peripheral units are accessible via a channel subsystem and the switching network fabric, the switching network fabric being separate from the channel subsystem and comprising a plurality of switches and links, the switching network fabric having autonomy over a choice of one or more links coupling one or more switches of the plurality of switches to define a path from the channel subsystem to a peripheral unit of the one or more peripheral units, wherein the program employs the switching network fabric to only access the one or more peripheral units accessible to it as defined in the pre-specified I/O configuration data set, and wherein the explicitly specifying comprises indicating an address for a peripheral unit of the one or more peripheral units, wherein the address comprises one portion that identifies an exit switch of the switching network fabric and another portion that identifies a port on that exit switch.

15. The system of claim 14, wherein the one or more peripheral units comprise at least one control unit.

16. The system of claim 14, wherein the program comprises an operating system.

17. The system of claim 16, wherein the operating system is located within a logical partition of the computing environment.

18. The system of claim 14, wherein the predictable I/O configuration facilitates a secure computing environment.

19. The system of claim 14, wherein the means for explicitly specifying comprises a configuration program to provide the address for a peripheral unit of the one or more peripheral units, wherein the address is a multi-byte address.

20. The system of claim 19, wherein said configuration program is also capable of supporting one-byte addressing for other I/O configurations.

21. The system of claim 14, wherein the means for explicitly specifying further comprises, after initialization of the program, employing human generated input data to issue a machine command to provide the address for a peripheral unit of the one or more peripheral units, wherein the address is a multi-byte address.

22. The system of claim 21, wherein said machine command is also capable of supporting one-byte addressing for other I/O configurations.

23. The system of claim 14, further comprising means for changing the predictable I/O configuration after initialization of the program, the means for changing being responsive to human generated input data.

24. The system of claim 23, wherein the means for changing comprises a machine command, said machine command also being capable of changing an I/O configuration that does not have a fabric, even though addressing for the I/O configuration without a fabric is different than addressing for the I/O configuration with a fabric.

25. The system of claim 14, further comprising means for obtaining information relating to the predictable I/O configuration.

26. The system of claim 25, wherein the information comprises information associated with at least one of one or more channel paths of the predictable I/O configuration, one or more subchannels of the predictable I/O configuration, and a channel subsystem of the computing environment.

27. A system of providing input/output (I/O) configurations of a computing environment, said system comprising:
    at least one of an executable configuration program and an executable machine command to facilitate explicitly pre-specifying in an I/O configuration data set which one or more peripheral units of a computing environment, comprising a switching network fabric and a plurality of peripheral units coupled thereto, are accessible by a program of the computing environment based on at least one human generated I/O configuration input statement, the I/O configuration data set providing a predictable, pre-specified I/O configuration for the program at initialization of the program, wherein the one or more peripheral units are accessible via a channel subsystem and the switching network fabric, the switching network fabric being separate from the channel subsystem and comprising a plurality of switches and links, the switching network fabric having autonomy over a choice of one or more links coupling one or more switches of the plurality of switches to define a path from the channel subsystem to a peripheral unit of the one or more peripheral units, wherein the program employs the switching network fabric to only access the one or more peripheral units accessible to it as defined in the pre-specified I/O configuration data set, and wherein the explicitly specifying comprises indicating an address for a peripheral unit of the one or more peripheral units, wherein the address comprises one portion that identifies an exit switch of the switching network fabric and another portion that identifies a port on that exit switch.

28. At least one program storage device readable by a machine tangibly embodying at least one program of instructions executable by the machine to perform a method of providing input/output (I/O) configurations of a computing environment, said method comprising:

explicitly pre-specifying in an I/O configuration data set which one or more peripheral units of a computing environment, comprising a switching network fabric and a plurality of peripheral units coupled thereto, are accessible by a program of the computing environment based on at least one human generated I/O configuration input statement, the I/O configuration data set providing a predictable, pre-specified I/O configuration for the program at initialization of the program, wherein the one or more peripheral units are accessible via a channel subsystem and the switching network fabric, the switching network fabric being separate from the channel subsystem and comprising a plurality of switches and links, the switching network fabric having autonomy over a choice of one or more links coupling one or more switches of the plurality of switches to define a path from the channel subsystem to a peripheral unit of the one or more peripheral units, wherein the program employs the switching network fabric to only access the one or more peripheral units accessible to it as defined in the pre-specified I/O configuration data set, and wherein the explicitly specifying comprises indicating an address for a peripheral unit of the one or more peripheral units, wherein the address comprises one portion that identifies an exit switch of the switching network fabric and another portion that identifies a port on that exit switch.

29. The at least one program storage device of claim 28, wherein the predictable I/O configuration facilitates a secure computing environment.

30. The at least one program storage device of claim 28, wherein the explicitly specifying comprises employing a configuration program to provide the address for a peripheral unit of the one or more peripheral units, wherein the address is a multi-byte address.

31. The at least one program storage device of claim 30, wherein said configuration program is also capable of supporting one-byte addressing for other I/O configurations.

32. The at least one program storage device of claim 28, wherein the explicitly specifying further comprises, after initialization of the program, employing human generated input data to issue a machine command to provide the address for a peripheral unit of the one or more peripheral units, wherein the address is a multi-byte address.

33. The at least one program storage device of claim 32, wherein said machine command is also capable of supporting one-byte addressing for other I/O configurations.

34. The at least one program storage device of claim 28, wherein the method further comprises changing the predictable I/O configuration after initialization of the program, the changing being responsive to human generated input data.

35. The at least one program storage device of claim 34, wherein the changing comprises using a machine command, said machine command also being capable of changing an I/O configuration that does not have a fabric, even though addressing for the I/O configuration without a fabric is different than addressing for the I/O configuration with a fabric.

36. The at least one program storage device of claim 28, wherein said method further comprises obtaining information relating to the predictable I/O configuration.

37. The at least one program storage device of claim 36, wherein the information comprises information associated with at least one of one or more channel paths of the predictable I/O configuration, one or more subchannels of the predictable I/O configuration, and a channel subsystem of the computing environment.

* * * * *